(12) United States Patent
Wang et al.

(10) Patent No.: US 12,168,455 B2
(45) Date of Patent: Dec. 17, 2024

(54) METHOD FOR OPTIMIZING DECISION-MAKING REGULATION AND CONTROL, METHOD FOR CONTROLLING TRAVELING OF VEHICLE, AND RELATED APPARATUS

(71) Applicant: HUAWEI TECHNOLOGIES CO., LTD., Guangdong (CN)

(72) Inventors: Bin Wang, Beijing (CN); Yuzheng Zhuang, Shenzhen (CN); Wulong Liu, Montreal (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 252 days.

(21) Appl. No.: 18/048,679

(22) Filed: Oct. 21, 2022

(65) Prior Publication Data

US 2023/0107033 A1 Apr. 6, 2023

Related U.S. Application Data

(63) Continuation of application No. PCT/CN2021/088320, filed on Apr. 20, 2021.

(30) Foreign Application Priority Data

Apr. 23, 2020 (CN) .............................. 202010329110

(51) Int. Cl.
*B60W 60/00* (2020.01)
*G06N 3/04* (2023.01)

(52) U.S. Cl.
CPC ........... *B60W 60/0011* (2020.02); *G06N 3/04* (2013.01)

(58) Field of Classification Search
CPC ..... B60W 60/0011; B60W 2050/0006; B60W 50/0098; B60W 2050/0083;
(Continued)

(56) References Cited

U.S. PATENT DOCUMENTS

| 2019/0185013 A1* | 6/2019 | Zhou | G06N 20/00 |
| 2020/0080861 A1* | 3/2020 | Qiao | G01C 21/3446 |

FOREIGN PATENT DOCUMENTS

| CN | 111483468 A | 8/2020 |
| CN | 111488988 A | 8/2020 |
| EP | 2690582 B1 | 5/2016 |

OTHER PUBLICATIONS

Serban Pt.Rxandru Constantin et al:A Standard Driven Software Architecture for Fully Autonomous Vehicles 2018 IEEE International Conference on Software Architecture Companion (ICSA-C) IEEE,Apr. 30, 2018 (Apr. 30, 2018) pp. 120-127 XP033383671 Total:8pages.

* cited by examiner

*Primary Examiner* — Abby Y Lin
*Assistant Examiner* — Dylan M Katz
(74) *Attorney, Agent, or Firm* — WOMBLE BOND DICKINSON (US) LLP

(57) ABSTRACT

In the method for optimizing decision-making regulation and control, a first traveling sequence is obtained, where the first traveling sequence includes a first trajectory sequence of the vehicle in information about a first environment and first target driving behavior output by a behavior decision-making layer of a decision-making and control system based on the information about the first environment. A second traveling sequence is obtained, where the second traveling sequence includes a second trajectory sequence output by a motion planning layer of the decision-making and control system based on preset second target driving behavior and the second target driving behavior. The behavior decision-making layer is optimized based on a difference between the first traveling sequence and a preset traveling sequence, and the motion planning layer is optimized based on a difference (Continued)

between the second traveling sequence and the preset traveling sequence.

20 Claims, 7 Drawing Sheets

(58) Field of Classification Search
CPC ........ B60W 60/001; B60W 2050/0088; G06N 3/04; G06N 3/044; G06N 3/084; Y02T 10/40; G05D 1/0217; G05D 1/0214
See application file for complete search history.

METHOD FOR OPTIMIZING DECISION-MAKING REGULATION AND CONTROL, METHOD FOR CONTROLLING TRAVELING OF VEHICLE, AND RELATED APPARATUS

CROSS-REFERENCE TO RELATED APPLICATIONS

This application is a continuation of International Application No. PCT/CN2021/088320, filed on Apr. 20, 2021, which claims priority to Chinese Patent Application No. 202010329110.8, filed on Apr. 23, 2020. The disclosures of the aforementioned applications are hereby incorporated by reference in their entireties.

TECHNICAL FIELD

This application relates to the field of autonomous driving, and more specifically, to a method for optimizing decision-making regulation and control, a method for controlling traveling of a vehicle by using a decision-making and control system, and a related apparatus.

BACKGROUND

Artificial intelligence (AI) is a theory, a method, a technology, and an application system that simulate, extend, and expand human intelligence by using a digital computer or a machine controlled by a digital computer, sense an environment, obtain knowledge, and use the knowledge to obtain an optimal result. In other words, the artificial intelligence is a branch of computer science, and is intended to understand the essence of intelligence and produce a new intelligent machine that can react in a manner similar to human intelligence. The artificial intelligence studies design principles and implementation methods of various intelligent machines, so that the machines have perception, inference, and decision-making functions. Researches in the field of artificial intelligence include a robot, natural language processing, computer vision, decision-making and inference, human-computer interaction, recommendation and search, an AI basic theory, and the like.

Autonomous driving is a mainstream application in the field of artificial intelligence. The autonomous driving technology relies on cooperation of computer vision, a radar, a monitoring apparatus, a global positioning system, and the like, so that a motor vehicle can implement autonomous driving without human intervention. An autonomous driving vehicle uses various computing systems to assist in transporting passengers from one location to another location. Some autonomous driving vehicles may require some initial inputs or continuous inputs from an operator (such as a navigator, a driver, or a passenger). An autonomous driving vehicle allows an operator to switch from a manual operation mode to an autonomous driving mode or allows a mode between the manual operation mode and the autonomous driving mode. Because the autonomous driving technology does not require a human to drive a motor vehicle, a human driving error can be effectively avoided in theory, traffic accidents can be reduced, and road transportation efficiency can be improved. Therefore, the autonomous driving technology attracts increasing attention.

In the autonomous driving technology, a method for implementing autonomous driving by using an autonomous driving decision-making and control system is provided. A hierarchical architecture is used for the autonomous driving decision-making and control system, including a behavior decision-making layer and a motion planning layer. After receiving a global path planned for an autonomous driving vehicle, the behavior decision-making layer may perform specific behavior decision-making (for example, overtaking a vehicle by changing a lane or continuing to follow the front vehicle) based on environment information (for example, information about another vehicle, a pedestrian, an obstacle, and a road traffic rule) obtained by a sensing module of the autonomous driving vehicle. The motion planning layer may plan, based on the behavior decision-making performed by the behavior decision-making layer, a trajectory that meets a specific constraint condition (for example, a dynamics constraint condition of the vehicle, collision avoidance, or passenger comfort). The trajectory is used as an input of a control module of the autonomous driving vehicle to determine a final traveling path of the autonomous driving vehicle.

In the conventional technology, after receiving the behavior decision-making output by the behavior decision-making layer, the motion planning layer may evaluate the behavior decision-making, and provide feedback information. Examples of the feedback information include that a speed is excessively fast or excessively slow, a decision-making command cannot be executed, a required steering input is excessively large, a road condition-based decision-making command is unsafe, and the like. Then, the behavior decision-making layer corrects the output behavior decision-making based on the feedback information, to improve safety of the vehicle.

The traveling safety of the vehicle is improved to some extent by using the foregoing method. Because the safety of the vehicle is crucial in traveling of the vehicle, the traveling safety of the vehicle needs to be further improved. In other words, how to further improve the traveling safety of the vehicle in the autonomous driving decision-making and control system is an urgent technical problem to be resolved.

SUMMARY

This application provides a method for optimizing decision-making regulation and control, a method for controlling traveling of a vehicle by using a decision-making and control system, and a related apparatus, to implement closed-loop optimization of a behavior decision-making layer and a motion planning layer in the decision-making and control system. This helps improve performance of the decision-making and control system, and ensures traveling safety of the vehicle.

According to a first aspect, this application provides a method for optimizing decision-making regulation and control. The method is applied to a decision-making and control system, the decision-making and control system includes a behavior decision-making layer and a motion planning layer, and the method includes: obtaining a first trajectory sequence, where the first trajectory sequence includes trajectory information of a vehicle in a first environment; obtaining first target driving behavior information output by the behavior decision-making layer based on information about the first environment; combining the first trajectory sequence and the first target driving behavior information to obtain a first traveling sequence; obtaining a second trajectory sequence output by the motion planning layer based on preset second target driving behavior information; combining the second trajectory sequence and the second target driving information to obtain a second traveling sequence; optimizing the behavior decision-making layer based on a difference between the first traveling sequence and a preset target teaching traveling sequence, where the target teaching traveling sequence includes a teaching trajectory sequence and teaching driving behavior information; and optimizing the motion planning layer based on a difference between the second traveling sequence and the target teaching traveling sequence.

In an embodiment, the entire behavior decision-making layer is optimized based on differences between the sequence including the behavior output by the behavior decision-making layer and the sequence including the trajectory sequence output by the motion planning layer, and the same teaching sequence. In this way, both the traveling sequence including the behavior output by the behavior decision-making layer and the traveling sequence including the trajectory sequence output by the motion planning layer approximate the same teaching traveling sequence. In this way, behavior output by the optimized behavior decision-making layer is optimal behavior at the behavior decision-making layer, and a trajectory sequence output by the motion planning layer based on the behavior may also be optimal. Performance of decision-making regulation and control of the autonomous driving decision-making system can be greatly improved by using this optimization algorithm, and finally safety of the vehicle is improved.

In addition, both of the behavior decision-making layer and the motion planning layer are optimized. In this way, closed-loop optimization of the behavior decision-making layer and the motion planning layer in the autonomous driving decision-making and control system can be implemented. Performance of the behavior decision-making layer and performance of the motion planning layer are further improved, performance of the autonomous driving decision-making and control system is further improved, and finally the safety of the vehicle is improved.

In an embodiment, the optimizing the behavior decision-making layer based on a difference between the first traveling sequence and a target teaching traveling sequence includes: obtaining a first output obtained when the first traveling sequence is input into a determining model, where the determining model is used to determine whether the input traveling sequence is the teaching traveling sequence, and optimizing the behavior decision-making layer based on the first output. The optimizing the motion planning layer based on a difference between the second traveling sequence and the target teaching traveling sequence includes: obtaining a second output obtained when the second traveling sequence is input into the determining model, and optimizing the motion planning layer based on the second output. The method further includes: obtaining a third output obtained when the target teaching traveling sequence is input into the determining model, and optimizing the determining model based on the first output, the second output, and the third output.

In an embodiment, the first traveling sequence, the second traveling sequence, and the target teaching traveling sequence are determined by using the determining model, to separately obtain the first output, the second output, and the third output. Because the difference between the first traveling sequence and the target teaching traveling sequence may be represented by using the first output, the behavior decision-making layer is optimized based on the first output, so that the first output approximates the third output, and the behavior decision-making layer can learn knowledge of corresponding driving behavior corresponding to a trajectory sequence in the target teaching traveling sequence. In this way, the optimized behavior decision-making layer can output proper driving behavior.

Because the difference between the second traveling sequence and the target teaching traveling sequence may be represented by using the second output, the motion planning layer is optimized based on the second output, so that the second output approximates the third output, and the motion planning layer can learn knowledge of a corresponding trajectory sequence corresponding to driving behavior in the target teaching traveling sequence. In this way, the optimized motion planning layer can output a proper trajectory sequence.

In this closed-loop joint optimization manner, both of the behavior decision-making layer and the motion planning layer can be optimized. Therefore, robustness of the autonomous driving policy control system can be improved, and finally the safety of the vehicle can be improved.

In an embodiment, the optimizing the motion planning layer based on the second output includes: optimizing the motion planning layer based on the second output by using a policy optimization algorithm.

For example, the motion planning layer may be optimized based on the second output by using a trust region policy optimization algorithm.

In an embodiment, the optimizing the behavior decision-making layer based on the first output includes: obtaining a gradient of a first function, and optimizing the behavior decision-making layer based on the gradient of the first function and by using a gradient descent algorithm, where an independent variable of the first function includes the first output.

In an embodiment, the first function is defined as follows:

$$\frac{1}{N}\sum_{j=1}^{N}\left[\frac{1-\omega}{T_j}\sum_{t=1}^{T_j}\log D_\psi(s_t^c, a_t^c, c_j^c) - \frac{\lambda_E}{T_j}\sum_{t=1}^{T_j}c_j^e \log p_{c_a}(c_t^c \mid s_t^e, a_{t-1}^e) - \frac{\lambda_G}{T_j}\sum_{t=1}^{T_j}c_j^e \log p_{c_a}(c_t^c \mid s_t^g, a_{t-1}^g)\right].$$

N represents a preset quantity of times of optimizing the behavior decision-making layer based on the gradient of the first function, $\omega$ is a preset value, $T_j$ represents a length of the first trajectory sequence, $D_\psi(s_t^c, a_t^c, c_j^c)$ represents the first output, $\lambda_E$ is a preset value, $c_j^e$ represents corresponding teaching traveling behavior during a $j^{th}$ time of the N times of optimization, $p_{c_a}(c_t^c \mid s_t^e, a_{t-1}^e)$ represents a conditional probability of outputting traveling behavior $c_t^c$ by the behavior decision-making layer when an input of the behavior decision-making layer is the teaching trajectory sequence, and $\lambda_G$ is a preset value.

In an embodiment, the optimizing the determining model based on the first output, the second output, and the third output includes: obtaining a gradient of a second function, and optimizing the determining model based on the gradient of the second function and by using a gradient ascent algorithm, where independent variables of the second function include the first output, the second output, and the third output.

In an embodiment, an expression of the second function is:

$$\frac{1}{N_e}\sum_{n=1}^{N_e}\log(1 - D_\psi(s_n^e, a_n^e, c_n^e)) +$$

-continued $$\frac{1}{N}\sum_{j=1}^{N}\left[\frac{\omega}{T_j}\sum_{t=1}^{T_j}\log D_\psi\left(s_t^g, a_t^g, c_j^g\right) + \frac{1-\omega}{T_j}\sum_{t=1}^{T_j}\log D_\psi\left(s_t^c, a_t^c, c_j^c\right)\right].$$

$N_e$ represents a length of the teaching trajectory sequence, $D_\psi(s_n^e, a_n^e, c_n^e)$ represents the third output, N represents a preset quantity of times of optimizing the determining model, ω is the preset value, $T_j$ represents the length of the first trajectory sequence, $D_\psi(s_t^g, a_t^g, c_j^g)$ represents the second output, and $D_\psi(s_t^c, a_t^c, c_j^c)$ represents the first output.

In an embodiment, the target teaching traveling sequence is selected from a preconfigured teaching data set, and the teaching data set includes a plurality of teaching traveling sequences in a first driving scenario.

In an embodiment, the method further includes: updating the teaching data set, where the updated teaching data set includes a teaching traveling sequence in a second driving scenario.

In an embodiment, the target teaching traveling sequence is a traveling sequence collected when a driver drives the vehicle.

According to a second aspect, this application provides a method for controlling traveling of a vehicle by using a decision-making and control system. The method includes: outputting target driving behavior information of the vehicle based on environment information of the vehicle by using a behavior decision-making layer of the decision-making and control system, where the decision-making and control system may be obtained through optimization by using the method according to any one of the first aspect or the possible implementations of the first aspect; outputting trajectory information of the vehicle based on the target driving behavior information by using a motion planning layer of the decision-making and control system; and controlling traveling of the vehicle based on the trajectory information.

In an embodiment, because the used decision-making and control system is obtained through optimization by using the method according to any one of the first aspect or the possible implementations of the first aspect, this helps improve reasonableness of the trajectory information output by the decision-making and control system, and improve traveling safety of the vehicle.

According to a third aspect, this application provides an apparatus for optimizing decision-making regulation and control. The apparatus includes: an obtaining module, configured to obtain a first trajectory sequence, where the first trajectory sequence includes trajectory information of a vehicle in a first environment, and the obtaining module is further configured to obtain first target driving behavior information output by a behavior decision-making layer of a decision-making and control system based on information about the first environment; a combination module, configured to combine the first trajectory sequence and the first target driving behavior information to obtain a first traveling sequence, where the obtaining module is further configured to obtain a second trajectory sequence output by a motion planning layer of the decision-making and control system based on preset second target driving behavior information, and the combination module is further configured to combine the second trajectory sequence and the second target driving behavior information to obtain a second traveling sequence; and an optimization module, configured to optimize the behavior decision-making layer based on a difference between the first traveling sequence and a target teaching traveling sequence, where the optimization module is further configured to optimize the motion planning layer based on a difference between the second traveling sequence and the target teaching traveling sequence.

In an embodiment, the entire behavior decision-making layer is optimized based on differences between the sequence including the behavior output by the behavior decision-making layer and the sequence including the trajectory sequence output by the motion planning layer, and the same teaching sequence. In this way, the traveling sequence including the behavior output by the behavior decision-making layer and the traveling sequence including the trajectory sequence output by the motion planning layer approximate the same teaching traveling sequence. In this way, behavior output by the optimized behavior decision-making layer is optimal behavior at the behavior decision-making layer, and a trajectory sequence output by the motion planning layer based on the behavior may also be optimal. Performance of decision-making regulation and control of the autonomous driving decision-making system can be greatly improved by using this optimization apparatus, and finally safety of the vehicle is improved.

In addition, both of the behavior decision-making layer and the motion planning layer are optimized. In this way, closed-loop optimization of the behavior decision-making layer and the motion planning layer in the autonomous driving decision-making and control system can be implemented. Performance of the behavior decision-making layer and performance of the motion planning layer are further improved, performance of the autonomous driving decision-making and control system is further improved, and finally the safety of the vehicle is improved.

In an embodiment, the optimization module is configured to: obtain a first output obtained when the first traveling sequence is input into a determining model, where the determining model is used to determine whether the input traveling sequence is the teaching traveling sequence; optimize the behavior decision-making layer based on the first output; obtain a second output obtained when the second traveling sequence is input into the determining model; optimize the motion planning layer based on the second output; obtain a third output obtained when the target teaching traveling sequence is input into the determining model; and optimize the determining model based on the first output, the second output, and the third output.

In an embodiment, the first traveling sequence, the second traveling sequence, and the target teaching traveling sequence are determined by using the determining model, to separately obtain the first output, the second output, and the third output. Because the difference between the first traveling sequence and the target teaching traveling sequence may be represented by using the first output, the behavior decision-making layer is optimized based on the first output, so that the first output approximates the third output, and the behavior decision-making layer can learn knowledge of corresponding driving behavior corresponding to a trajectory sequence in the target teaching traveling sequence. In this way, the optimized behavior decision-making layer can output proper driving behavior.

Because the difference between the second traveling sequence and the target teaching traveling sequence may be represented by using the second output, the motion planning layer is optimized based on the second output, so that the second output approximates the third output, and the motion planning layer can learn knowledge of a corresponding trajectory sequence corresponding to driving behavior in the target teaching traveling sequence. In this way, the optimized motion planning layer can output a proper trajectory sequence.

In this closed-loop joint optimization manner, both of the behavior decision-making layer and the motion planning layer can be optimized. Therefore, robustness of the autonomous driving policy control system can be improved, and finally the safety of the vehicle can be improved.

In an embodiment, the optimization module is configured to optimize the motion planning layer based on the second output by using a policy optimization algorithm.

For example, the motion planning layer may be optimized based on the second output by using a trust region policy optimization algorithm.

In an embodiment, the optimization module is configured to: obtain a gradient of a first function, and optimize the behavior decision-making layer based on the gradient of the first function and by using a gradient descent algorithm, where an independent variable of the first function includes the first output.

In an embodiment, the first function is defined as follows:

$$\frac{1}{N}\sum_{j=1}^{N}\left[\frac{1-\omega}{T_j}\sum_{t=1}^{T_j}\log D_\psi(s_t^c, a_t^c, c_j^c) - \frac{\lambda_E}{T_j}\sum_{t=1}^{T_j}c_j^e\log pc_a(c_t^c \mid s_t^e, a_{t-1}^e) - \frac{\lambda_G}{T_j}\sum_{t=1}^{T_j}c_j^g\log pc_a(c_t^c \mid s_t^g, a_{t-1}^g)\right].$$

N represents a preset quantity of times of optimizing the behavior decision-making layer based on the gradient of the first function, ω is a preset value, $T_j$ represents a length of the first trajectory sequence, $D_\psi(s_t^c,a_t^c,c_j^c)$ represents the first output, $\lambda_E$ is a preset value, $c_j^e$ represents corresponding teaching traveling behavior during a $j^{th}$ time of the N times of optimization, $p_{c_a}(c_t^c \mid s_t^e,a_{t-1}^e)$ represents a conditional probability of outputting traveling behavior $c_t^c$ by the behavior decision-making layer when an input of the behavior decision-making layer is the teaching trajectory sequence, and $\lambda_G$ is a preset value.

In an embodiment, the optimization module is configured to: obtain a gradient of a second function, and optimize the determining model based on the gradient of the second function and by using a gradient ascent algorithm, where independent variables of the second function include the first output, the second output, and the third output.

In an embodiment, the second function is defined as follows:

$$\frac{1}{N_e}\sum_{n=1}^{N_e}\log(1 - D_\psi(s_n^e, a_n^e, c_n^e)) + \frac{1}{N}\sum_{j=1}^{N}\left[\frac{\omega}{T_j}\sum_{t=1}^{T_j}\log D_\psi(s_t^g, a_t^g, c_j^g) + \frac{1-\omega}{T_j}\sum_{t=1}^{T_j}\log D_\psi(s_t^c, a_t^c, c_j^c)\right].$$

$N_e$ represents a length of the teaching trajectory sequence, $D_\psi(s_n^e,a_n^e,c_n^e)$ represents the third output, N represents a preset quantity of times of optimizing the determining model, ω is the preset value, $T_j$ represents the length of the first trajectory sequence, $D_\psi(s_t^g,a_t^g,c_j^g)$ represents the second output, and $D_\psi(s_t^c,a_t^c,c_j^c)$ represents the first output.

In an embodiment, the target teaching traveling sequence is selected from a preconfigured teaching data set, and the teaching data set includes a plurality of teaching traveling sequences in a first driving scenario.

In an embodiment, the apparatus further includes an updating module, configured to update the teaching data set, where the updated teaching data set includes a teaching traveling sequence in a second driving scenario.

In an embodiment, the target teaching traveling sequence is a traveling sequence collected when a driver drives the vehicle.

According to a fourth aspect, this application provides an apparatus for controlling traveling of a vehicle by using a decision-making and control system, where the decision-making and control system includes a behavior decision-making layer and a motion planning layer, the decision-making and control system may be obtained through optimization by using the method according to any one of the first aspect or the possible embodiments of the first aspect. The apparatus includes: a behavior output module, configured to output target driving behavior information of the vehicle based on environment information of the vehicle by using the behavior decision-making layer; a trajectory output module, configured to infer trajectory information of the vehicle based on the target driving behavior information by using the motion planning layer; and a control module, configured to control traveling of the vehicle based on the trajectory information.

In an embodiment, because a used autonomous driving decision-making and control model is a model obtained through optimization by using any one of the first aspect or the possible embodiments of the first aspect, a control policy that is optimal for the entire autonomous driving decision-making and control model can be obtained through inference, so that traveling safety of the vehicle can be improved.

According to a fifth aspect, an apparatus for optimizing decision-making regulation and control is provided. The apparatus includes: a memory, configured to store a program; and a processor, configured to execute the program stored in the memory. When the program stored in the memory is executed, the processor is configured to perform the method according to any one of the first aspect or the embodiments of the first aspect.

According to a sixth aspect, an apparatus for controlling traveling of a vehicle by using a decision-making and control system is provided. The apparatus includes: a memory, configured to store a program; and a processor, configured to execute the program stored in the memory. When the program stored in the memory is executed, the processor is configured to perform the method according to the second aspect.

According to a seventh aspect, a computer-readable medium is provided. The computer-readable medium stores program code for execution by a computing device, and the program code includes program code used to perform the method according to any one of the first aspect or the embodiments of the first aspect.

According to an eighth aspect, a computer-readable medium is provided. The computer-readable medium stores program code for execution by a computing device, and the program code includes program code used to perform the method according to the second aspect.

According to a ninth aspect, a computer program product including instructions is provided. When the computer program product is run on a computer, the computer is enabled to perform the method according to any one of the first aspect or the embodiments of the first aspect.

According to a tenth aspect, a computer program product including instructions is provided. When the computer program product is run on a computer, the computer is enabled to perform the method according to the second aspect.

According to an eleventh aspect, a chip is provided. The chip includes a processor and a data interface. The processor reads, through the data interface, instructions stored in a memory, to perform the method according to any one of the first aspect or the embodiments of the first aspect.

Optionally, in an embodiment, the chip may further include the memory. The memory stores the instructions, and the processor is configured to execute the instructions stored in the memory. When the instructions are executed, the processor is configured to perform the method according to any one of the first aspect or the embodiments of the first aspect.

According to a twelfth aspect, a chip is provided. The chip includes a processor and a data interface. The processor reads, through the data interface, instructions stored in a memory, to perform the method according to the second aspect.

Optionally, in an embodiment, the chip may further include the memory. The memory stores the instructions, and the processor is configured to execute the instructions stored in the memory. When the instructions are executed, the processor is configured to perform the method according to the second aspect.

According to a thirteenth aspect, a computing device is provided. The computing device includes: a memory, configured to store a program; and a processor, configured to execute the program stored in the memory. When the program stored in the memory is executed, the processor is configured to perform the method according to any one of the first aspect or the embodiments of the first aspect.

According to a fourteenth aspect, a computing device is provided. The computing device includes: a memory, configured to store a program; and a processor, configured to execute the program stored in the memory. When the program stored in the memory is executed, the processor is configured to perform the method according to the second aspect.

According to a fifteenth aspect, a vehicle is provided. The vehicle includes: a memory, configured to store a program; and a processor, configured to execute the program stored in the memory. When the program stored in the memory is executed, the processor is configured to perform the method according to any one of the first aspect or the embodiments of the first aspect.

According to a sixteenth aspect, a vehicle is provided. The vehicle includes: a memory, configured to store a program; and a processor, configured to execute the program stored in the memory. When the program stored in the memory is executed, the processor is configured to perform the method according to the second aspect.

DESCRIPTION OF EMBODIMENTS

Figure 1:
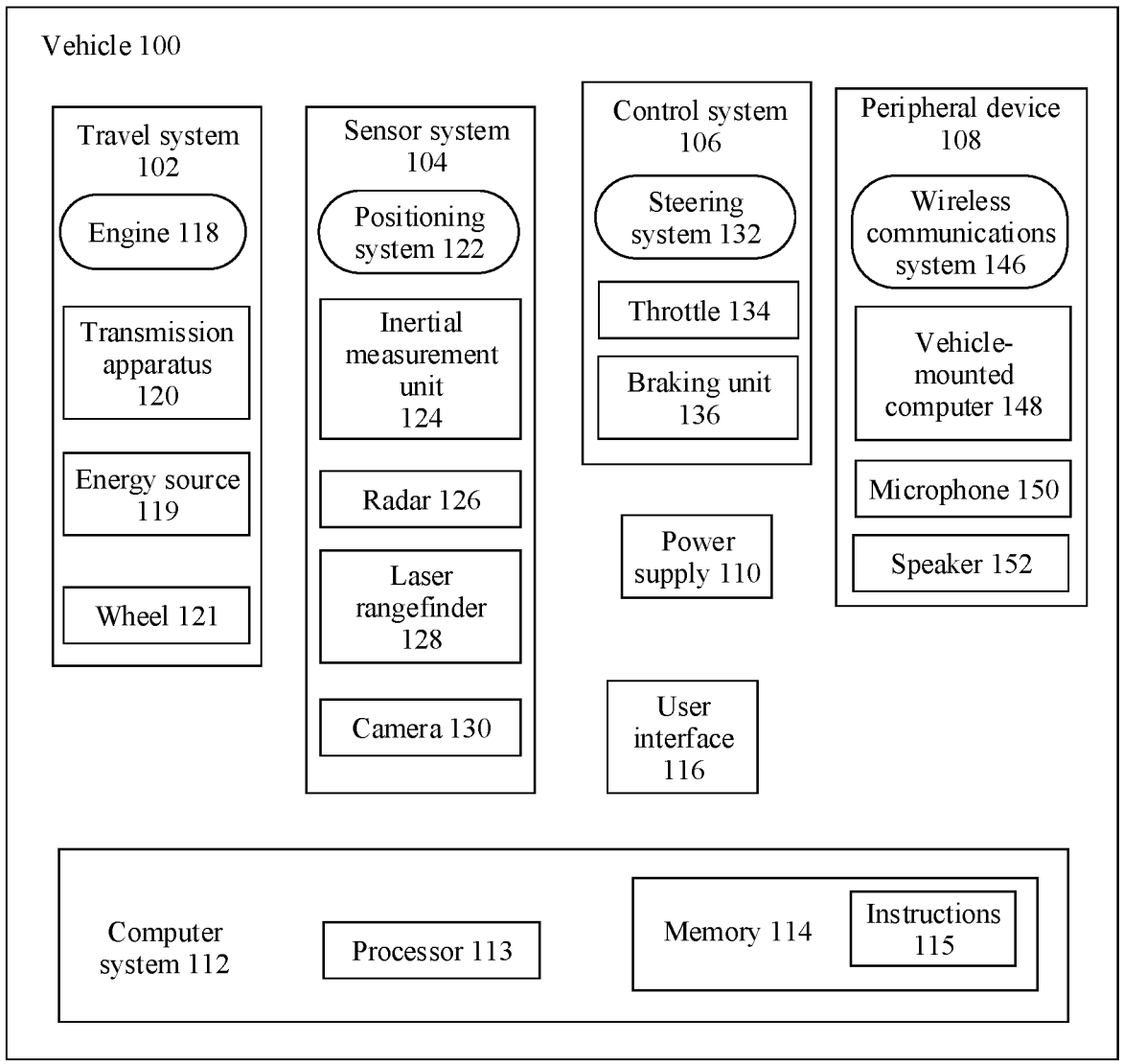
FIG. 1 is a schematic diagram of a structure of a vehicle according to an embodiment of this application.

The following first explains some terms in embodiments of this application.

A decision-making and control system includes a behavior decision-making module and a motion planning module, and may further include modules such as a sensing module, a positioning module, and a control module. In embodiments of this application, the behavior decision-making module is also referred to as a behavior decision-making layer, and the motion planning module is also referred to as a motion planning layer.

The decision-making and control system in this application may alternatively be an autonomous driving system. For example, the decision-making and control system in this application may be an advanced driving assistance system (ADAS), may be an advanced driving system (advanced driving system), or may be any other driving system including the behavior decision-making layer and the motion planning layer.

The behavior decision-making layer performs specific behavior decision-making (for example, overtaking a vehicle by changing a lane or continuing to follow the vehicle) based on environment information (for example, information about another vehicle, a pedestrian, an obstacle, a road traffic rule, and the like) obtained from a sensing module.

The motion planning layer plans, based on the behavior decision-making, a trajectory that meets a specific constraint condition (for example, a dynamics constraint condition of a vehicle, collision avoidance, passenger comfort, or the like). The trajectory is used as an input of a control module to determine a final traveling path of the vehicle.

Environment information may include environment data such as a road structure, a road surface condition, and a weather condition when a vehicle travels.

Status information may include status data such as locations, speeds, and directions of a vehicle, a surrounding vehicle, and a pedestrian. In embodiments of this application, the environment information and the status information may also be collectively referred to as environment status information.

Action information may include action data such as accelerations and steering wheel angles of a vehicle and a surrounding vehicle.

A teaching traveling sequence means that a trajectory sequence and driving behavior included in the teaching traveling sequence are trusted, reliable, or safe, and may be used as an example for learning or reference by another driver and a driving system. The trajectory sequence in the teaching traveling sequence may be referred to as a teaching trajectory sequence, and the driving behavior in the teaching traveling sequence may be referred to as teaching driving behavior.

It may be understood that the foregoing information or data may be obtained by using a vehicle-mounted sensor, for example, a camera, a laser radar, or a millimeter-wave radar. The foregoing information or data may be originally collected video stream data, radar point cloud data, or analyzed structured information or data such as a location, a speed, a steering angle, and a size of a person, a vehicle, or an object. For the original video stream data and the radar point cloud data, the sensing module may process the data into identifiable and structured information or data such as a location, a speed, a steering angle, and a size of a person, a vehicle, or an object.

The following describes technical solutions of this application with reference to accompanying drawings.

FIG. 1 is a functional block diagram of a vehicle 100 according to an embodiment of this application. In an example, the vehicle 100 may be configured to be in a fully or partially autonomous driving mode. For example, the vehicle 100 in the autonomous driving mode may control the vehicle 100. A manual operation may be performed to determine current statuses of the vehicle and an ambient environment of the vehicle, determine possible behavior of at least one another vehicle in the ambient environment, determine a confidence level corresponding to a possibility that the another vehicle performs the possible behavior, and control the vehicle 100 based on determined information. When the vehicle 100 is in the autonomous driving mode, the vehicle 100 may be set to operate without interacting with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, each subsystem and element of the vehicle 100 may be interconnected in a wired or wireless manner.

The travel system 102 may include a component that provides power for the vehicle 100 to move. In an embodiment, the travel system 102 may include an engine 118, an energy source 119, a transmission apparatus 120, and a wheel 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy for another system of the vehicle 100, for example, the sensor system 104, the computer system 112, the control system 106, or the peripheral device 108.

The transmission apparatus 120 may transmit mechanical power from the engine 118 to the wheel 121. The transmission apparatus 120 may include a gearbox, a differential, and a drive shaft. In an example, the transmission apparatus 120 may further include another component, for example, a clutch. The drive shaft may include one or more shafts that may be coupled to one or more wheels 121.

The sensor system 104 may include several sensors that sense information about the ambient environment of the vehicle 100. For example, the sensor system 104 may include a positioning system 122, an inertial measurement unit (IMU) 124, a radar 126, a laser rangefinder 128, a camera 130, and the like. The positioning system 122 may be a global positioning system (GPS), or may be a BeiDou system or another positioning system.

The sensor system 104 may further include sensors, for example, an in-vehicle air quality monitor, a fuel gauge, an oil temperature gauge, and the like of an internal system of the vehicle 100. Sensor data from one or more of the sensors may be used for detecting an object and corresponding characteristics (e.g., a location, a shape, a direction, a speed, and the like) of the object. Such detection is a key function of a secure operation of the vehicle 100.

The positioning system 122 may be configured to estimate a geographical location of the vehicle 100. The IMU 124 is configured to sense location and orientation changes of the vehicle 100 based on an inertial acceleration. In an example, the IMU 124 may be a combination of an accelerometer and a gyroscope.

The radar 126 may sense an object in the ambient environment of the vehicle 100 by using a radio signal. In some examples, in addition to sensing an object, the radar 126 may be further configured to sense a speed and/or a forward direction of the object.

The laser rangefinder 128 may sense, by using a laser, an object in an environment in which the vehicle 100 is located. In some examples, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 is configured to control the vehicle 100 and a component of the vehicle 100. The control system 106 may include various elements, for example, include a steering system 132, a throttle 134, a braking unit 136, and the like.

The steering system 132 may be operated to adjust a forward direction of the vehicle 100. For example, in an example, the steering system 132 may be a steering wheel system.

The throttle 134 is configured to: control an operating speed of the engine 118 and further control a speed of the vehicle 100.

The braking unit 136 is configured to control the vehicle 100 to decelerate. The braking unit 136 may use friction to slow down the wheel 121. In some examples, the braking unit 136 may convert kinetic energy of the wheel 121 into a current. Alternatively, the braking unit 136 may reduce a rotational speed of the wheel 121 in another form to control the speed of the vehicle 100.

Certainly, for example, the control system 106 may additionally or alternatively include components in addition to those shown and described. Alternatively, the control system 106 may not include some of the foregoing shown components.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In an embodiment, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive a user input. The vehicle-mounted computer 148 may be operated by using a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Similarly, the speaker 152 may output audio to the user of the vehicle 100.

The wireless communications system 146 may communicate with one or more devices directly or by using a communications network. For example, the wireless communications system 146 may use a third-generation mobile communications technology (3G) for communication, for example, a code division multiple access (CDMA) communications system or a global system for mobile communications (GSM); use a fourth-generation mobile communications technology (4G) for communication, for example, long term evolution (LTE); or use a fifth-generation mobile communications technology (5G) for communication.

The wireless communications system 146 may communicate with a wireless local area network (WLAN) by using wireless access (Wi-Fi). In some examples, the wireless communications system 146 may directly communicate with a device through an infrared link, Bluetooth, or a ZigBee (ZigBee) protocol. Alternatively, the wireless communications system 146 may use another wireless protocol, for example, various vehicle communications systems for communication. For example, the wireless communications system 146 may include one or more dedicated short-range communications (DSRC) devices, and these devices may include public and/or private data communication between the vehicle and/or a roadside station.

The power supply 110 may supply power to various components of the vehicle 100. In an example, the power supply 110 may be a rechargeable lithium-ion or lead-acid battery. One or more battery packs of such batteries may be configured as the power supply to supply power to the components of the vehicle 100. In some examples, the power supply 110 and the energy source 119 may be implemented together, for example, a power supply and an energy source in an all-electric vehicle are the same.

The user interface 116 is configured to provide information for or receive information from the user of the vehicle 100. In an embodiment, the user interface 116 may include one or more input/output devices within a set of peripheral devices 108, such as the wireless communications system 146, the vehicle-mounted computer 148, the microphone 150, and the speaker 152.

In an embodiment, one or more of the foregoing components may be installed separately from or associated with the vehicle 100. For example, the memory 114 may be partially or completely separated from the vehicle 100. The foregoing components may be communicatively coupled together in a wired and/or wireless manner.

Note that the foregoing components are merely examples. During actual application, components in the foregoing modules may be added or removed based on an actual requirement. FIG. 1 should not be construed as a limitation on this embodiment of this application.

The computer system 112 may include at least one processor 113. The processor 113 executes instructions 115 stored in a non-transitory computer-readable medium such as a memory 114. The computer system 112 may alternatively be a plurality of computing devices that control an individual component or a subsystem of the vehicle 100 in a distributed manner.

The processor 113 may be any conventional processor, such as a commercially available central processing unit (CPU). The processor may be a dedicated device of an application-specific integrated circuit (ASIC) or another hardware-based processor.

FIG. 1 functionally shows one processor and one memory. However, a person of ordinary skill in the art should understand that the computer system 112 of the vehicle 100 may actually include a plurality of processors or a plurality of memories. Different from using a single processor to perform the operations described in embodiments of this application, some components such as a steering component and a deceleration component may include respective processors. The processor performs only computation related to a component-specific function.

Some processors in the computer system 112 may be located far away from the vehicle 100 and wirelessly communicate with the vehicle 100.

In an embodiment, the memory 114 may include the instructions 115 (for example, program logic), and the instructions 115 may be executed by the processor 113 to perform various functions of the vehicle 100, including any function described above. The memory 114 may also include additional instructions, including instructions used to send data to, receive data from, interact with, and/or control one or more of the travel system 102, the sensor system 104, the control system 106, and the peripheral device 108.

In addition to the instructions 115, the memory 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

Some or all functions of the vehicle 100 are controlled by the computer system 112. The computer system 112 may control the functions of the vehicle 100 based on inputs received from various subsystems (for example, the travel system 102, the sensor system 104, and the control system 106) and from the user interface 116.

In some examples, the computer system 112 may process and analyze information collected by the sensor system 104 (for example, an image captured by the camera 130, and information about the vehicle 100 measured by the IMU), to identify traveling environment information and status information of the vehicle 100. The environment information of the vehicle 100 includes objects in the ambient environment of the vehicle 100 and/or features of the ambient environment. The objects and/or features may include traffic signals, road boundaries, and obstacles. The status information of the vehicle 100 includes information such as the speed, the location, and an acceleration of the vehicle 100.

For example, the computer system 112 may use an object recognition algorithm, a structure from motion (SFM) algorithm, video tracking, and another computer sensing technology to identify the environment information of the vehicle 100.

In some examples, when obtaining the environment information and the status information of the vehicle 100, the computer system 112 may further obtain action information of the vehicle 100 when the vehicle 100 is in an environment corresponding to the environment information and in a status corresponding to the status information.

In some examples, the computer system 112 may optimize a policy control system. For example, the computer system 112 may perform a method shown in FIG. 4 to optimize the policy control system on the vehicle 100.

Figure 7:
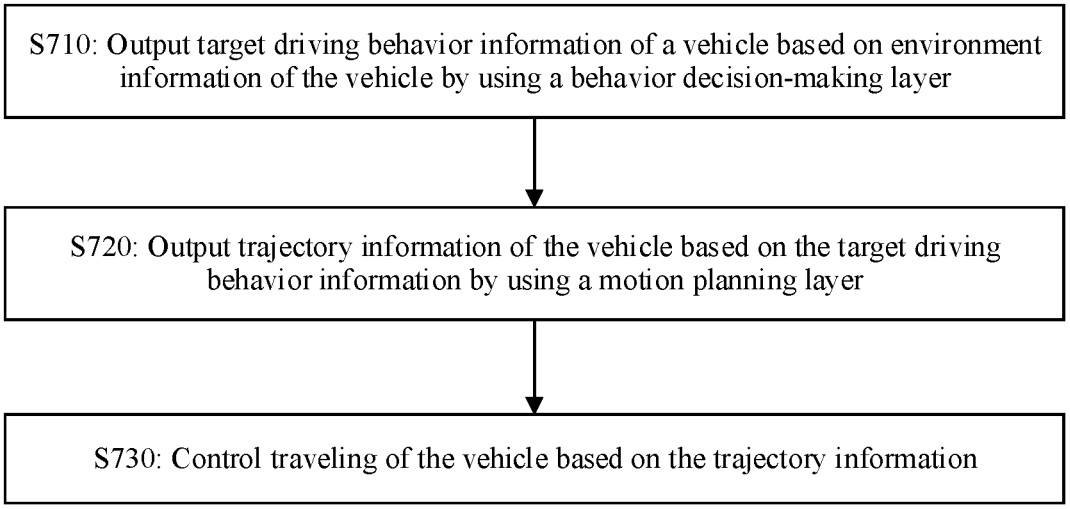
FIG. 7 is a schematic flowchart of a method for controlling traveling of a vehicle by using a policy control system according to an embodiment of this application.

After optimizing the policy control system, the computer system 112 may perform a method described in FIG. 7, to control traveling of the vehicle 100.

Figure 4:
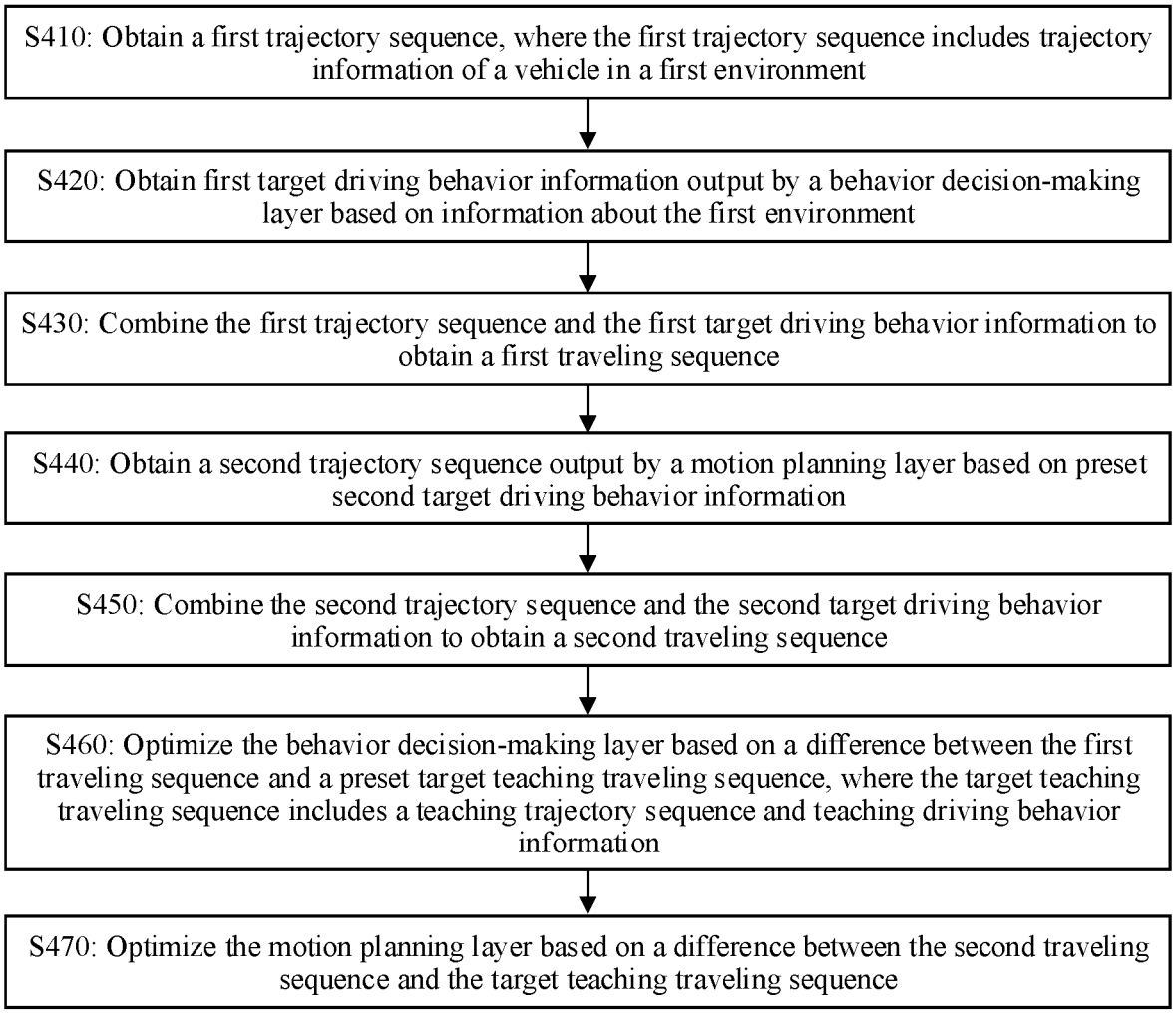
FIG. 4 is a schematic flowchart of a method for optimizing decision-making regulation and control according to an embodiment of this application.

In some examples, the policy control system optimized by using the method shown in FIG. 4 may be deployed in the vehicle 100, and the policy control system is used to control the traveling of the vehicle 100, for example, perform the method shown in FIG. 7.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of this application.

Figure 2:
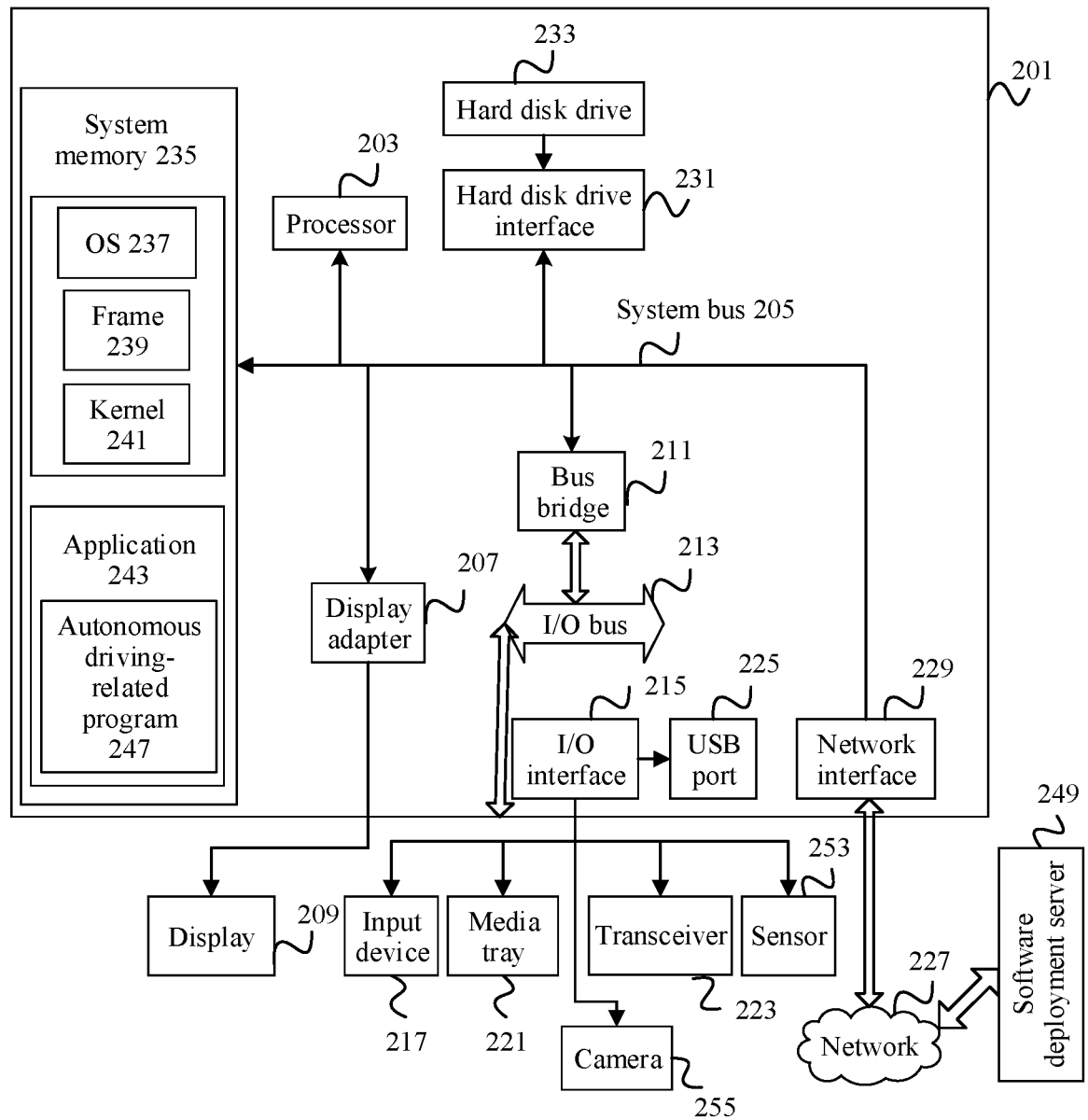
FIG. 2 is a schematic diagram of a structure of a computer system according to an embodiment of this application.

FIG. 2 is a schematic diagram of a structure of a computer system 201 according to an embodiment of this application. According to FIG. 2, the computer system 201 includes a processor 203, and the processor 203 is coupled to a system bus 205. The processor 203 may be one or more processors, and each processor may include one or more processor cores.

The computer system 201 may further include a display adapter 207. The display adapter 207 may drive a display 209, and the display 209 is coupled to the system bus 205.

The system bus 205 is coupled to an input/output (I/O) bus 213 through a bus bridge 211. An I/O interface 215 is coupled to the I/O bus. The I/O interface 215 communicates with a plurality of I/O devices, for example, an input device 217 or a media tray 221. Input devices include a keyboard, a mouse, a touchscreen, and the like. Media trays include a compact disc read-only memory (CD-ROM), a multimedia interface, and the like.

The computer system 201 may further include: a transceiver 223, which may send and/or receive a radio communications signal; a camera 255, which may capture static and dynamic digital video images; and an external universal serial bus (USB) port 225. Optionally, an interface connected to the I/O interface 215 may be the USB port.

The processor 203 may be any conventional processor, including a reduced instruction set computing (RISC) processor, a complex instruction set computing (CISC) processor, or a combination thereof. The processor may be a dedicated apparatus such as an application-specific integrated circuit. The processor 203 may be a neural network processor or a combination of a neural network processor and the foregoing conventional processor.

In an embodiment, the computer system 201 may be located away from a vehicle and wirelessly communicate with the vehicle. Some functions of the computer system 201 may be implemented by a processor disposed inside the vehicle, and other functions may be implemented by a remote processor, including taking actions required to perform a single maneuver.

The computer system 201 may communicate with a software deployment server 249 through a network interface 229. The network interface 229 is a hardware network interface, for example, a network interface card. A network 227 may be an external network, for example, the Internet, or may be an internal network, for example, an Ethernet or a virtual private network (VPN). The network 227 may alternatively be a wireless network, for example, a Wi-Fi network, a cellular network, or the like.

A hard disk drive interface 233 is coupled to the system bus 205. The hard disk drive interface 233 is connected to a hard disk drive 231. A system memory 235 is coupled to the system bus 205. Data running in the system memory 235 may include an operating system 237 and an application 243 of the computer system 201.

The operating system includes a shell 239 and a kernel 241. The shell 239 is an interface between a user and the kernel of the operating system. The shell is an outermost layer of the operating system. The shell manages interaction between the user and the operating system. The shell waits for a user's input, explains the user's input to the operating system, and processes various output results of the operating system.

The kernel 241 includes components of the operating system that are configured to manage a memory, a file, a peripheral, and a system resource. The kernel 241 directly interacts with hardware. The kernel of the operating system usually runs processes, provides communication between the processes, and provides CPU time slice management, interruption management, memory management, I/O management, and the like.

The application 243 includes a driving-related program 247 for controlling driving of a car, for example, includes a program for performing the method shown in FIG. 7. The application 243 also exists on a system of the software deployment server 249. In an embodiment, when the application 243 needs to be executed, the computer system 201 may download the application 243 from the software deployment server 249.

In an embodiment, the computer system 201 may download a policy control system from the software deployment server 249. In addition, the computer system 201 may further download, from the software deployment server 249, a program used to optimize the policy control system. Then, the computer system 201 may execute the program used to optimize the policy control system, to implement the method shown in FIG. 4, and optimize the policy control system.

In this embodiment, after optimizing the policy control system, the computer system 201 may perform the method shown in FIG. 7, to control traveling of the vehicle.

In another embodiment, the computer system 201 may download the policy control system from the software deployment server 249, and the policy control system is optimized by using the method of FIG. 4. In addition, the computer system 201 may perform the method shown in FIG. 7, to control traveling of the vehicle.

A sensor 253 is associated with the computer system 201. The sensor 253 is configured to detect an ambient environment of the computer system 201. For example, the sensor 253 can detect an animal, a car, an obstacle, a pedestrian crosswalk, and the like. Further, the sensor can detect an ambient environment of the animal, the car, the obstacle, or the pedestrian crosswalk. For example, the sensor can detect the ambient environment of the animal, such as other animals around the animal, a weather condition, and brightness of the ambient environment. Optionally, if the computer system 201 is located on an autonomous driving car, the sensor may be a camera, an infrared sensor, a chemical detector, a microphone, or the like.

The computer system (for example, the computer system 112 or the computer system 201) in this application may receive information from another computer system, or transfer information to another computer system. Alternatively, the sensor data collected by the sensor system 104 of the vehicle 100 may be transferred to another computer for processing.

Figure 3:
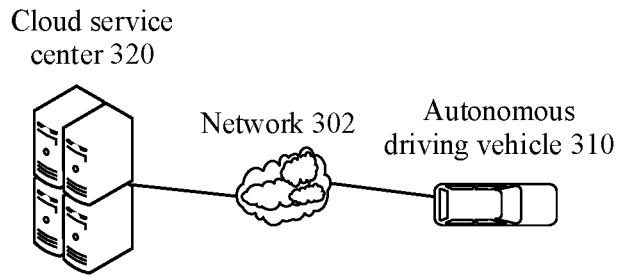
FIG. 3 is a schematic diagram of an application of driving a car by using a cloud side instruction according to an embodiment of this application.

FIG. 3 illustrates an example of a vehicle and a cloud service center. The cloud service center may receive data from an autonomous driving vehicle 310 (for example, traveling environment information of the vehicle, status information of the vehicle, action information of the vehicle, and the like) in an operating environment of the cloud service center by using a network 302 such as a wireless communications network.

In an example, the cloud service center runs, based on the received data, a related program that is for controlling driving of a car and that is stored in the cloud service center, to implement the method shown in FIG. 4, and optimize a policy control system corresponding to the vehicle 310.

The policy control system obtained through optimization may be sent to the vehicle 310. After receiving the policy control system, the vehicle 310 may perform the method shown in FIG. 7 based on data collected by a sensor system.

Alternatively, the policy control system obtained through optimization may be deployed on the cloud service center. After obtaining the traveling environment information, the status information, and the action information of the vehicle 310, the vehicle 310 sends the information to the cloud service center by using the network 302. The cloud service center 320 may perform the method in FIG. 7.

The network 302 may include various configurations and protocols, including the Internet, the World Wide Web, an intranet, a virtual private network, a wide area network, a local area network, a private network using one or more company-specific communications protocols, the Ethernet, Wi-Fi, and the HTTP, and various combinations thereof. Such communication may be performed by any device that can transmit data to and from another computer, such as a modem or a wireless interface.

In an example, the cloud service center 320 may include a server having a plurality of computers, for example, a load balancing server cluster. These servers may be configured similar to the computer system 112 or the computer system 201, and have a processor, a memory, instructions, and the like.

FIG. 4 is an example flowchart of a method for optimizing decision-making regulation and control according to an embodiment of this application. The method may include operations S410 to S470.

In operation S410, a first trajectory sequence is obtained, where the first trajectory sequence includes trajectory information of a vehicle in a first environment.

The first trajectory sequence may be a trajectory sequence output by a motion planning layer based on information about the first environment. If this operation is performed for the first time, the first trajectory sequence may be preset or may be obtained through random initialization.

The first trajectory sequence may include trajectory information of the vehicle at each of one or more time points.

The trajectory information at each time point may be represented by using environment status information and action information of the vehicle at the time point. In this case, the trajectory sequence is represented by using a sequence including the environment status information and the action information. For example, if the environment information is denoted as s, and the action information is denoted as a, the trajectory sequence may be denoted as $<s, a>$.

In operation S420 first target driving behavior information output by a behavior decision-making layer is obtained based on the information about the first environment.

For example, the information about the first environment is input into the behavior decision-making layer, and the behavior decision-making layer outputs behavior of the vehicle based on the input. For ease of description, the behavior is referred to as first target driving behavior.

It may be understood that an input of the behavior decision-making layer may further include other information, for example, may include the status information and the action information of the vehicle.

In an embodiment, the behavior decision-making layer may include a fully-connected layer. Alternatively, the behavior decision-making layer may be a recurrent neural network, or has a structure similar to a structure of the recurrent neural network.

In operation S430, the first trajectory sequence and the first target driving behavior information are combined to obtain a first traveling sequence.

In other words, after the first target driving behavior information of the vehicle is obtained, a sequence may be generated based on the first trajectory sequence and the first target driving behavior. For ease of description, the sequence may be referred to as the first traveling sequence.

When the first trajectory sequence and the first target driving behavior information are combined, the first trajectory sequence and the first target driving behavior information may be combined through appending. For example, the first target driving behavior information may be appended to the first trajectory sequence, to obtain the first traveling sequence.

For example, when the first trajectory sequence is denoted as $<s^c, a^c>$, and the first target driving behavior information is denoted as $c^c$, the first traveling sequence obtained after the first trajectory sequence and the first target driving behavior information are combined may be denoted as $<s^c, a^c, c^c>$.

In operation S440, a second trajectory sequence output by the motion planning layer is obtained based on preset second target driving behavior information.

For example, the preset second target driving behavior is input into the motion planning layer, and the motion planning layer outputs a trajectory sequence based on the second target driving behavior. For ease of description, the trajectory sequence is referred to as the second trajectory sequence.

It may be understood that an input of the motion planning layer may further include other information, for example, may include current environment status information of the vehicle.

This operation may be separately performed at a plurality of time points. The motion planning layer may infer corresponding action information based on the current environment status information at each time point and the second target driving behavior information, and output corresponding trajectory information based on the action information. In this case, a plurality of pieces of trajectory information corresponding to the plurality of time points form the second trajectory sequence.

The second trajectory sequence may be represented by using the environment status information and the action information. For example, the second trajectory sequence may be denoted as $<s^g, a^g, s^g>$. $s^g$ represents the environment status information, and $a^g$ represents the action information.

That the second target driving behavior information is preset may be understood as follows: It is specified in advance that randomly generated behavior information is used as the second target driving behavior information; it is specified in advance that the first target driving behavior information is used as the second target driving behavior information; or a sampling model used to output corresponding behavior information based on an input trajectory sequence may be obtained through training by using a teaching traveling sequence, and it is specified in advance that behavior information output by the sampling model based on the first trajectory sequence is used as the second target driving behavior information.

In an embodiment, the behavior decision-making layer may include the fully-connected layer. Alternatively, the behavior decision-making layer may be the recurrent neural network, or has the structure similar to the structure of the recurrent neural network.

In operation S450, the second trajectory sequence and the second target driving behavior information are combined to obtain a second traveling sequence.

In other words, after the second trajectory sequence is obtained, a sequence may be obtained by combining the second trajectory sequence and the second target driving behavior information. For ease of description, the sequence is referred to as the second traveling sequence.

When the second trajectory sequence and the second target driving behavior information are combined, the second trajectory sequence and the second target driving behavior information may be combined through appending. For example, when the second trajectory sequence is denoted as $<s^g, a^g>$, and the second target driving behavior information is denoted as $c^g$, the second traveling sequence obtained through appending may be denoted as $<s^g, a^g, c^g>$.

In operation S460, the behavior decision-making layer is optimized based on a difference between the first traveling sequence and a preset target teaching traveling sequence, where the target teaching traveling sequence includes a teaching trajectory sequence and teaching driving behavior information.

The target teaching traveling sequence may be selected from a preset teaching data set, and the teaching data set may include a plurality of teaching traveling sequences. The target teaching traveling sequence may be randomly selected from the teaching data set, or may be selected from the teaching data set based on the second target driving behavior information and the first trajectory sequence. For example, a teaching traveling sequence that is in the teaching data set and that has a highest similarity with a sequence obtained by combining the second target driving behavior information and the first trajectory sequence may be selected as the target teaching traveling sequence.

In operation S470, the motion planning layer is optimized based on a difference between the second traveling sequence and the target teaching traveling sequence.

In the method in this embodiment, the entire behavior decision-making layer is optimized based on differences between the sequence including the behavior output by the behavior decision-making layer and the sequence including the trajectory sequence output by the motion planning layer, and the same teaching sequence. In this way, the traveling sequence including the behavior output by the behavior decision-making layer and the traveling sequence including the trajectory sequence output by the motion planning layer approximate the same teaching traveling sequence. In this way, behavior output by the optimized behavior decision-making layer is optimal behavior at the behavior decision-making layer, and a trajectory sequence output by the motion planning layer based on the behavior may also be optimal. Performance of decision-making regulation and control of an autonomous driving decision-making system can be greatly improved by using this optimization algorithm, and finally safety of the vehicle is improved.

In addition, both of the behavior decision-making layer and the motion planning layer are optimized. In this way, closed-loop optimization of the behavior decision-making layer and the motion planning layer in the autonomous driving decision-making and control system can be implemented. Performance of the behavior decision-making layer and performance of the motion planning layer are further improved, performance of the autonomous driving decision-making and control system is further improved, and finally the safety of the vehicle is improved.

The target teaching traveling sequence may be a sequence collected when a human driver drives the vehicle. This helps the decision-making and control system learn a driving style of the human driver, to help the vehicle implement human-style driving.

In an embodiment, performing S410 to S460 for one time may be referred to as one iteration, or may be referred to as one training iteration or one time of optimization. Performing S450 for one time may be referred to as performing optimization of the behavior decision-making layer for one time, and performing S460 for one time may be referred to as performing optimization of the motion planning layer for one time.

In an embodiment, when the behavior decision-making layer is optimized based on the difference between the first traveling sequence and the target teaching traveling sequence, in some possible implementations, the method may include: obtaining a first output obtained when the first traveling sequence is input into a determining model, and optimizing the behavior decision-making layer based on the first output, where the determining model is used to determine whether the input traveling sequence is the teaching traveling sequence.

The obtaining a first output result obtained when the first traveling sequence is input into a determining model may include: inputting the first traveling sequence into the determining model, and obtaining an output of the determining model. For ease of description, the output is referred to as the first output.

In an embodiment, the determining model may be a neural network model. For example, the determining model may be a neural network model including a fully-connected layer; or may be a recurrent neural network model, or has a structure similar to a structure of the recurrent neural network.

In an embodiment, when the behavior decision-making layer is optimized based on the first output, in some possible implementations, the method may include: obtaining a gradient of a first function, and optimizing the behavior decision-making layer by using a gradient descent algorithm, where an independent variable of the first function includes the first output.

In an embodiment, optimizing the behavior decision-making layer includes optimizing a parameter of the behavior decision-making layer, and the parameter of the behavior decision-making layer may be denoted as $\alpha$.

In an embodiment, the first function is defined as follows:

$$\frac{1}{N}\sum_{j=1}^{N}\left[\frac{1-\omega}{T_j}\sum_{t=1}^{T_j}\log D_\psi(s_t^c, a_t^c, c_j^c) - \right.$$

$$\left. \frac{\lambda_E}{T_j}\sum_{t=1}^{T_j} c_j^e \log p c_a(c_t^c \mid s_t^e, a_{t-1}^e) - \frac{\lambda_G}{T_j}\sum_{t=1}^{T_j} c_j^e \log p c_a(c_t^c \mid s_t^g, a_{t-1}^g)\right].$$

N represents a quantity of iterations of optimizing the behavior decision-making layer based on the gradient of the first function, or in other words, N represents the quantity of iterations, and a value of N is preset; $\omega$ is a preset value; $T_j$ represents a length of the first trajectory sequence or a length of the second trajectory sequence; $D_\psi(s_t^c, a_t^c, c_j^c)$ represents the first output; $\lambda_E$ is a preset value; $c_j^e$ represents teaching driving behavior information in a $j^{th}$ iteration; $p_{c_a}(c_t^c \mid s_t^e, a_{t-1}^e)$ represents a conditional probability of outputting driving behavior $c_t^c$ when the input of the behavior decision-making layer is the teaching trajectory sequence; and $\lambda_G$ is a preset value. The length of the first trajectory sequence may be the same as the length of the second trajectory sequence. $c_t^c$ represents driving behavior information at a time point t in the first traveling sequence.

In other words, the gradient may be calculated according to the following formula, and the parameter of the behavior decision-making layer is adjusted based on the gradient and by using a gradient ascent algorithm:

$$\nabla_\alpha \frac{1}{N}\sum_{j=1}^{N}\left[\frac{1-\omega}{T_j}\sum_{t=1}^{T_j}\log D_\psi(s_t^c, a_t^c, c_j^c) - \right.$$

$$\left. \frac{\lambda_E}{T_j}\sum_{t=1}^{T_j} c_j^e \log p c_a(c_t^c \mid s_t^e, a_{t-1}^e) - \frac{\lambda_G}{T_j}\sum_{t=1}^{T_j} c_j^e \log p c_a(c_t^c \mid s_t^g, a_{t-1}^g)\right].$$

In an embodiment, the first traveling sequence is determined by using the determining model, to obtain the first output. Because the difference between the first traveling sequence and the target teaching traveling sequence may be represented by using the first output, the behavior decision-making layer is optimized based on the first output, so that the first target driving behavior approximates the teaching driving behavior, and the behavior decision-making layer can learn knowledge of corresponding driving behavior corresponding to a trajectory sequence in the target teaching traveling sequence. In this way, the optimized behavior decision-making layer can output proper driving behavior.

In an embodiment, when the motion planning layer is optimized based on a second output, in some possible implementations, the method may include: optimizing the motion planning layer based on the second output by using a policy optimization algorithm.

In an embodiment, an implementation of optimizing the motion planning layer is optimizing a parameter of the motion planning layer. The parameter of the motion planning layer may be denoted as θ.

For example, the parameter of the motion planning layer may be adjusted based on the second output by using a near-end policy optimization algorithm or a trust region policy optimization algorithm in the field of deep reinforcement learning.

When the parameter of the motion planning layer is adjusted by using the policy optimization algorithm, a feedback signal $r=-\log[D_\psi(s_t^g,a_t^g,c_t^g)]$ may be generated based on the second output, r is used as a reward function $r(s_t)$ of the trust region policy optimization algorithm, and the parameter of the motion planning layer is updated according to the reward function. $D_\psi(s_t^g,a_t^g,c_t^g)$ represents an output of trajectory information and driving behavior information at a moment t in the second traveling sequence when the second traveling sequence is input into the determining model.

In an embodiment, the second traveling sequence is determined by using the determining model, to obtain the second output. Because the difference between the second traveling sequence and the target teaching traveling sequence may be represented by using the second output, the motion planning layer is optimized based on the second output, so that the second trajectory sequence approximates the teaching trajectory sequence, and the motion planning layer can learn knowledge of a corresponding trajectory sequence corresponding to driving behavior in the target teaching traveling sequence. In this way, the optimized motion planning layer can output a proper trajectory sequence.

In this closed-loop joint optimization manner, both of the behavior decision-making layer and the motion planning layer can be optimized. Therefore, robustness of the autonomous driving policy control system can be improved, and finally the safety of the vehicle can be improved.

In an embodiment, when the behavior decision-making layer is optimized based on the first output and the motion planning layer is optimized based on the second output, the method may further include: obtaining a third output obtained when the target teaching traveling sequence is input into the determining model, and optimizing the determining model based on the first output, the second output, and the third output.

In an embodiment, when the determining model is optimized based on the first output, the second output, and the third output, in some possible implementations, the method may include: obtaining a gradient of a second function, and optimizing the determining model based on the gradient and by using the gradient ascent algorithm, where independent variables of the second function include the first output, the second output, and the third output.

In an embodiment, optimizing the determining model includes optimizing a parameter of the determining model. The parameter of the determining model may be denoted as ψ.

In an embodiment, the second function is defined as follows:

$$\frac{1}{N_e}\sum_{n=1}^{N_e}\log(1 - D_\psi(s_n^e, a_n^e, c_n^e)) +$$

$$\frac{1}{N}\sum_{j=1}^{N}\left[\frac{\omega}{T_j}\sum_{t=1}^{T_j}\log D_\psi(s_t^g, a_t^g, c_j^g) + \frac{1-\omega}{T_j}\sum_{t=1}^{T_j}\log D_\psi(s_t^c, a_t^c, c_j^c)\right].$$

$N_e$ represents a length of the teaching trajectory sequence; $D_\psi(s_n^e,a_n^e,c_n^e)$ represents the third output; N represents a quantity of times of optimizing the determining model based on the gradient of the second function, or in other words, N represents a quantity of iterations, and a value of N is preset; ψ is a preset value; $T_j$ represents the length of the first trajectory sequence or the length of the second trajectory sequence; $D_\psi(s_t^g,a_t^g,c_j^g)$ represents the second output; and $D_\psi(s_t^c, a_t^c, c_j^c)$ represents the first output. The length of the first trajectory sequence may be the same as the length of the second trajectory sequence.

In other words, the gradient may be calculated according to the following formula, and the parameter of the determining model is adjusted based on the gradient and by using the gradient ascent algorithm:

$$\nabla_\psi \frac{1}{N_e} \sum_{n=1}^{N_e} \log(1 - D_\psi(s_n^e, a_n^e, c_n^e)) +$$

$$\frac{1}{N} \sum_{j=1}^{N} \left[ \frac{\omega}{T_j} \sum_{t=1}^{T_j} \log D_\psi(s_t^g, a_t^g, c_j^g) + \frac{1-\omega}{T_j} \sum_{t=1}^{T_j} \log D_\psi(s_t^c, a_t^c, c_j^c) \right].$$

In an embodiment of this application, corresponding teaching data may be adjusted based on a target driving scenario of the vehicle. For example, teaching data in a driving scenario such as parking and intersection passing may be adjusted, and the method in FIG. 4 is repeatedly performed. Parameters of the behavior decision-making layer, the motion planning layer, and even the determining model are updated by using a feedback mechanism, to implement incremental learning of the behavior decision-making layer, the motion planning layer, and even the determining model.

In an embodiment, the teaching data set may include a plurality of teaching traveling sequences in one or more driving scenarios. For example, the teaching data set may include a teaching traveling sequence in a lane change scenario, and teaching driving behavior in the teaching traveling sequence may include left lane change, right lane change, following a front vehicle, and the like.

In an embodiment, the method may further include: updating the teaching data set, where the updated teaching data set includes a teaching traveling sequence in a second driving scenario. For example, a teaching traveling sequence in the driving scenario of the parking and the intersection passing is updated to the teaching data set.

After the teaching data set is updated, the vehicle may travel to corresponding scenarios, and re-execute the method in FIG. 4, so that the behavior decision-making layer and the motion planning layer in the autonomous driving decision-making and control system learn behavior decision-making and planning decision-making in the scenarios. In this way, incremental learning of the behavior decision-making layer and the motion planning layer is implemented.

It may be understood that S450 and S460 in this application do not necessarily need to be performed. In other words, only the behavior decision-making layer may be optimized, or the motion planning layer may be optimized by using another method.

Figure 5:
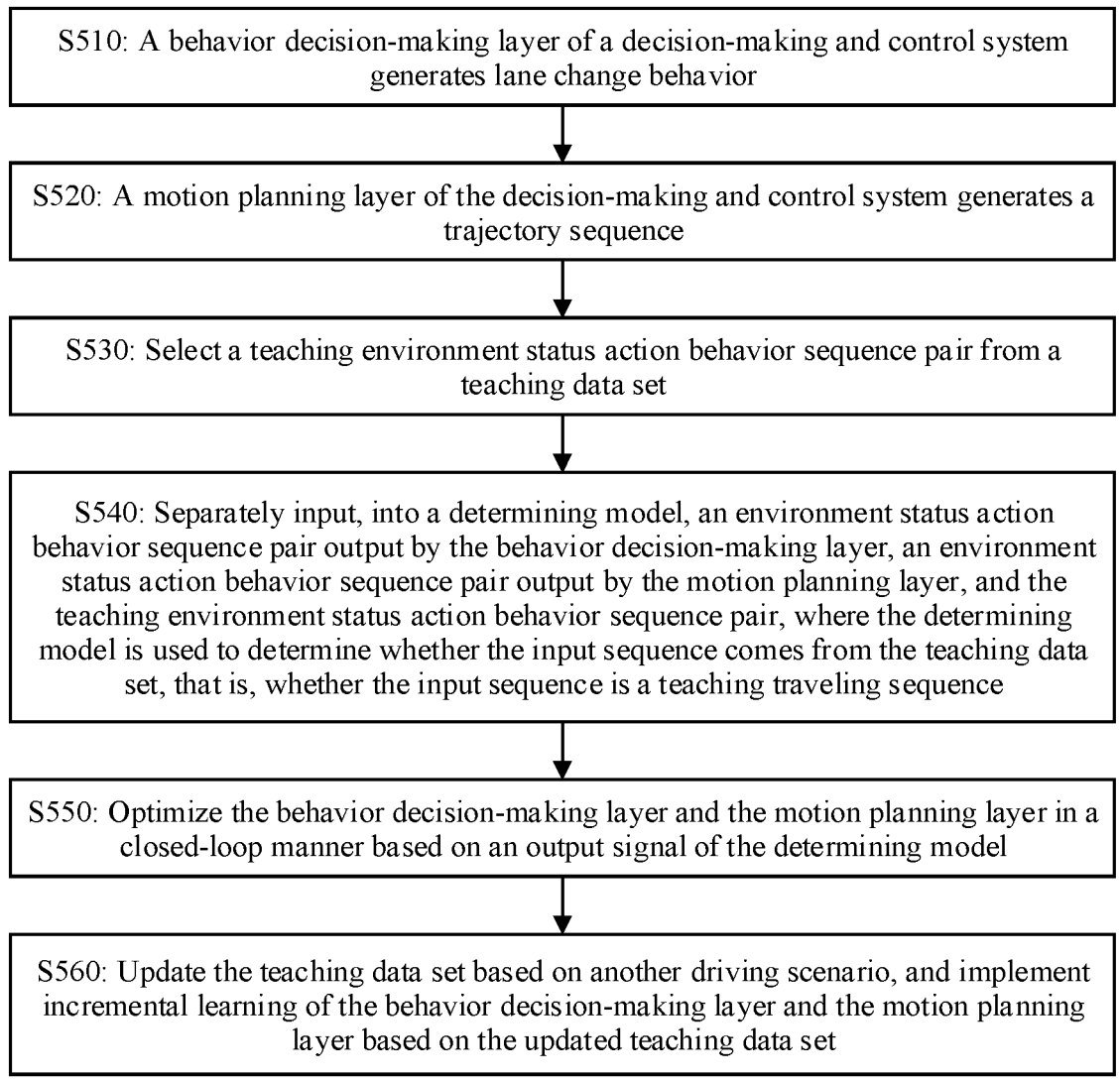
FIG. 5 is a schematic flowchart of another method for optimizing decision-making regulation and control according to an embodiment of this application.

FIG. 5 shows a method for optimizing an autonomous driving policy control model according to another embodiment of this application. The method includes operations S510 to S560. In an embodiment, the optimization algorithm is applied to behavior decision-making and motion trajectory planning learning of lane change behavior. An application scenario is shown in FIG. 6.

Figure 6:
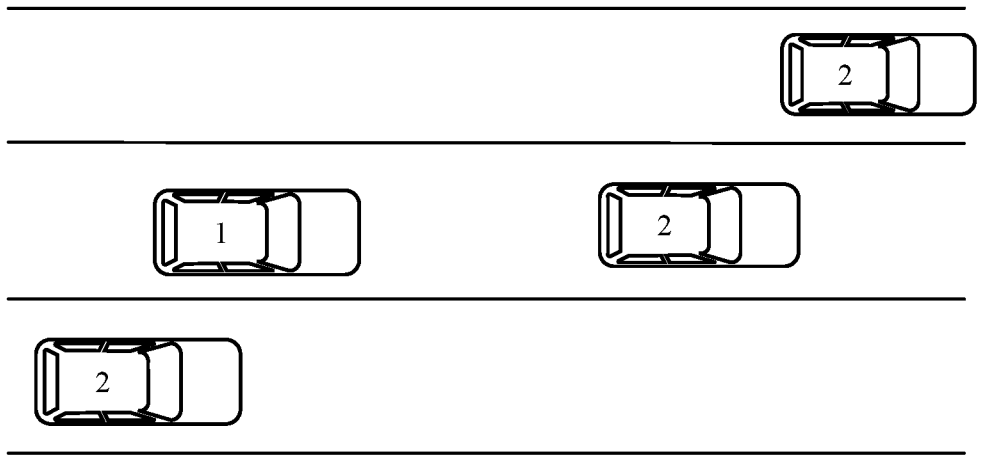
FIG. 6 is a schematic diagram of an application scenario of a method for optimizing decision-making regulation and control and a method for controlling traveling of a vehicle according to an embodiment of this application.

In FIG. 6, a vehicle numbered 1 represents an autonomous driving vehicle, and a vehicle numbered 2 represents another vehicle in a traveling environment of the autonomous driving vehicle. In this scenario, a behavior decision-making layer and a motion planning layer are optimized. In this way, the behavior decision-making layer can learn whether to change to a left lane or a right lane, or continue to follow a front vehicle in this scenario, and the motion planning layer can plan a proper trajectory based on behavior output by the behavior decision-making layer.

In operation S510, the behavior decision-making layer of a decision-making and control system generates lane change behavior.

For example, a sequence including environment information, status information of the vehicle, and action information that are obtained by a sensing module of the vehicle is denoted as <s,a>. s represents the environment information and the status information of the vehicle, a represents the action information, <s,a> may be used to represent a trajectory of the vehicle, and <s,a> is used as an input of the behavior decision-making layer of the decision-making and control system.

After <s,a> is input into the behavior decision-making layer, the behavior decision-making layer outputs the lane change behavior, where the lane change behavior may be denoted as $c^c$. <s,a> is re-denoted as <$s^c$, $a^c$>, an environment status action behavior sequence pair consists of <$s^c$, $a^c$> and $c^c$, and the environment status action behavior sequence pair is denoted as <$s^c$, $a^c$, $c^c$>. <$s^c$, $a^c$, $c^c$> is the foregoing first traveling sequence.

In operation S520, the motion planning layer of the decision-making and control system generates a trajectory sequence.

For example, the motion planning layer of the decision-making and control system outputs a lane change action based on a current environment status of the vehicle and specified lane change behavior $c^g$. In this process, traveling of the vehicle may be controlled based on the lane change action, the current environment status of the vehicle is updated, and the motion planning layer speculates anew lane change action based on an updated current environment status. A sequence including environment status information that is updated for a plurality of times is denoted as $s^g$, and a sequence including lane change actions that are updated for a plurality of times is denoted as $a^g$. In this case, $s^g$, $a^g$, and $c^g$ may form an environment status action behavior sequence pair <$s^g$, $a^g$, $c^g$>. <$s^g$, $a^g$, $c^g$> is the foregoing second traveling sequence, and <$s^g$, $a^g$> is an expression form of the foregoing second trajectory sequence.

In operation S530, a teaching environment status action behavior sequence pair is selected from the teaching data set.

In an embodiment, one environment status action behavior sequence pair may be randomly selected from the teaching data set, and the environment status action behavior sequence pair is denoted as <$s^e$, $a^e$, $c^e$>, namely, the teaching status action behavior sequence pair. <$s^e$, $a^e$, $c^e$> is the foregoing teaching traveling sequence, where <$s^e$, $a^e$> is a presentation form of a teaching trajectory sequence, that is, $c^e$ is the foregoing teaching driving behavior.

In operation S540, the processing logic may separately input, into a determining model $D_\psi$, the environment status action behavior sequence pair output by the behavior decision-making layer, the environment status action behavior sequence pair output by the motion planning layer, and the teaching environment status action behavior sequence pair, where the determining model is used to determine whether the input sequence comes from the teaching data set, that is, whether the input sequence is the teaching traveling sequence.

After the environment status action behavior sequence pair output by the behavior decision-making layer, the environment status action behavior sequence pair output by the motion planning layer, and the teaching environment status action behavior sequence pair are input into the determining model, an expression manner of an output signal of the determining model is $r=-\log[D_\psi(s,a,c)]$.

When the input is the environment status action behavior sequence pair output by the behavior decision-making layer, the output signal of the determining model may be represented as $r=-\log D_\psi(s^c,a^c,c^c)$. When the input of the determining model is the environment status action behavior sequence pair output by the motion planning layer, the output of the determining model is $r=-\log D_\psi(s^g,a^g,c^g)$. When the input of the discriminative model is the environment status action behavior sequence, the output of the discriminative model is $r=-\log D_\psi(s^e,a^e,c^e)$.

In operation S550, the behavior decision-making layer and the motion planning layer are jointly optimized in a closed-loop manner based on the output signal of the determining model.

For example, when a parameter of the motion planning layer is updated based on the output signal, a policy optimization algorithm may be used to update the parameter of the motion planning layer based on a feedback signal r. More specifically, a trust region policy optimization (TRPO) algorithm may be used.

For example, a parameter of the determining model may be updated based on a determining error $\log[D_\psi(s,a,c)]$. In an example, the parameter of the determining model may be updated by using a gradient ascent algorithm. For an update formula, refer to the second function shown above.

For example, a parameter of the behavior decision-making layer may be updated based on the feedback signal. In an example, the parameter of the determining model may be updated by using a gradient descent algorithm. For an update formula, refer to the first function shown above.

The foregoing optimization is performed by performing S510 to S550 in iterations until the determining model converges. The behavior decision-making layer and the motion planning layer may perform corresponding lane change behavior decision-making based on the current environment status in an application phase, and can plan a corresponding optimal trajectory based on the lane change behavior.

In operation S560, on the basis of a lane change scenario, the teaching data set is updated based on another driving scenario, and incremental learning of the behavior decision-making layer and the motion planning layer are implemented based on the updated teaching data set.

For example, driver teaching data in driving scenarios such as parking and intersection passing is updated. The updated driver teaching data may further perform incremental learning on performance of the behavior decision-making layer and the motion planning layer by using a feedback mechanism provided by the determining model.

FIG. 7 shows a method for controlling traveling of a vehicle by using a decision-making and control system according to an embodiment of this application. The decision-making system includes a behavior decision-making layer and a motion planning layer, and the behavior decision-making layer and the motion planning layer may be obtained through optimization by using the method in FIG. 4 or FIG. 5. The method may include operations S710 to S730.

In operation S710, target driving behavior information of the vehicle is output based on environment information of the vehicle by using the behavior decision-making layer.

For example, if environment information collected by a sensor system is input into the behavior decision-making layer, the behavior decision-making layer outputs corresponding target driving behavior information based on the environment information.

It may be understood that the input of the behavior decision-making layer may further include other information, for example, status information of the vehicle and action information that are collected by the sensor system.

In operation S720, trajectory information of the vehicle is output based on the target driving behavior information by using the motion planning layer.

For example, the target driving behavior is input into the motion planning layer, and the motion planning layer outputs the corresponding trajectory information based on the target driving behavior.

It may be understood that an input of the motion planning layer may further include other information, for example, may include environment information and the status information of the vehicle that are collected by the sensor system.

In a process in which the motion planning layer outputs the trajectory information based on the target driving behavior, the motion planning layer may first infer the action information based on the target driving behavior, and then output the trajectory information based on information such as the action information and the target driving behavior information.

In operation S730, the traveling of the vehicle is controlled based on the trajectory information. For this operation, refer to an implementation in the conventional technology. Details are not described herein.

In the method in this embodiment, because the behavior decision-making layer and the motion planning layer are obtained through optimization by using the method shown in FIG. 4 or the method shown in FIG. 5, this helps improve reasonableness of the trajectory information, and improve traveling safety of the vehicle.

Figure 8:
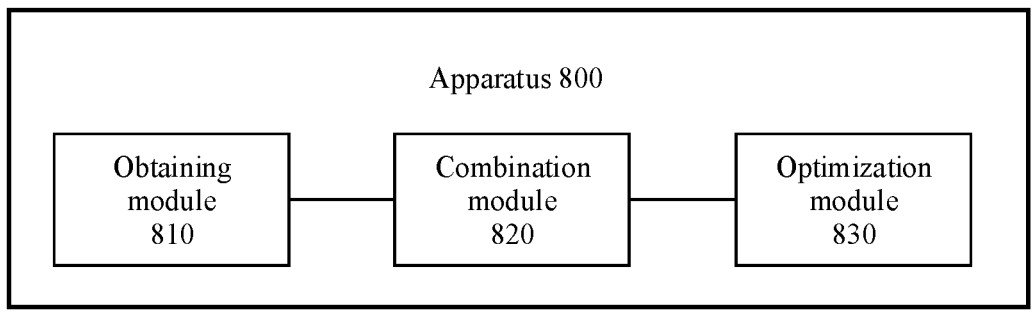
FIG. 8 is a schematic diagram of a structure of an apparatus for optimizing decision-making regulation and control according to an embodiment of this application.

FIG. 8 is a schematic diagram of a structure of an apparatus 800 for optimizing decision-making regulation and control according to an embodiment of this application. The apparatus 800 may include an obtaining module 810, a combination module 820, and an optimization module 830. The apparatus 800 may be configured to implement the method shown in FIG. 4 or FIG. 5.

For example, the obtaining module 810 may be configured to perform S410, S420, and S440, the combination module 820 may be configured to perform S430 and S450, and the optimization module 830 may be configured to perform S460 and S470.

The apparatus 800 may be deployed in a cloud environment. The cloud environment is an entity providing a cloud service for a user by using a basic resource in a cloud computing mode. The cloud environment includes a cloud data center and a cloud service platform. The cloud data center includes a large quantity of basic resources (including computing resources, storage resources, and network resources) owned by a cloud service provider. The computing resources included in the cloud data center may be a large quantity of computing devices (for example, servers). The apparatus 800 may be a server configured to optimize decision-making regulation and control in the cloud data center. Alternatively, the apparatus 800 may be a virtual machine that is created in the cloud data center and that is configured to optimize decision-making regulation and control. The apparatus 800 may alternatively be a software apparatus deployed on the server or the virtual machine in the cloud data center. The software apparatus is configured to optimize decision-making regulation and control. The software apparatus may be deployed on a plurality of servers in a distributed manner, deployed on a plurality of virtual machines in a distributed manner, or deployed on the virtual machine and the server in a distributed manner. For example, the obtaining module 810, the combination module 820, and the optimization module 830 in the apparatus 800 may be deployed on the plurality of servers in the distributed manner, deployed on the plurality of virtual machines in the distributed manner, or deployed on the virtual machine and the server in the distributed manner. For another example, when the optimization module 830 includes a plurality of submodules, the plurality of submodules may be deployed on the plurality of servers, deployed on the plurality of virtual machines in the distributed manner, or deployed on the virtual machine and the server in the distributed manner.

The apparatus 800 may be abstracted by the cloud service provider on the cloud service platform into a cloud service for optimizing decision-making regulation and control and provided for the user. After the user purchases the cloud service on the cloud service platform, the cloud environment provides, for the user by using the cloud service, the cloud service for optimizing decision-making regulation and control. The user may upload a to-be-optimized policy control system to the cloud environment through an application programming interface (API) or by using a web page provided by the cloud service platform. The apparatus 800 optimizes the policy control system. Finally, the policy control system obtained through optimization is returned by the apparatus 800 to a vehicle.

When the apparatus 800 is the software apparatus, the apparatus 800 may alternatively be independently deployed on a computing device in any environment.

Figure 9:
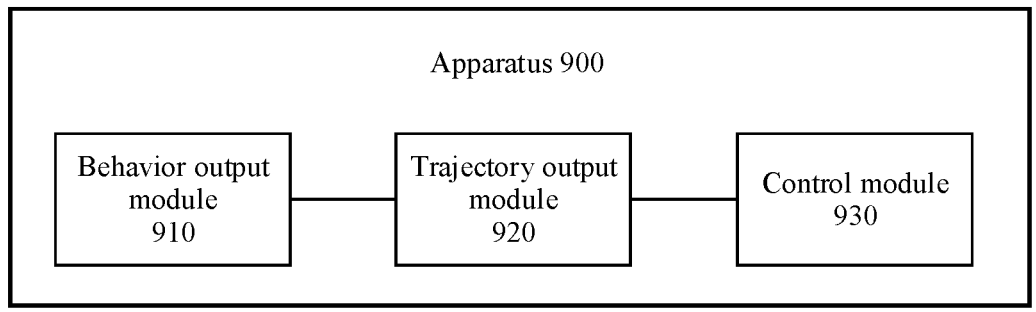
FIG. 9 is a schematic diagram of a structure of an apparatus for controlling traveling of a vehicle by using a policy control system according to an embodiment of this application.

FIG. 9 is a schematic diagram of a structure of an apparatus 900 for controlling traveling of a vehicle by using a policy control system according to an embodiment of this application. The apparatus 900 may include a behavior output module 910, a trajectory output module 920, and a control module 930. The apparatus 900 may be configured to implement the method shown in FIG. 7.

For example, the behavior output module 910 may be configured to perform S710, the trajectory output module 920 may be configured to perform S720, and the control module 930 may be configured to perform S730.

The apparatus 900 may be deployed in a cloud environment. The cloud environment is an entity providing a cloud service for a user by using a basic resource in a cloud computing mode. The cloud environment includes a cloud data center and a cloud service platform. The cloud data center includes a large quantity of basic resources (including computing resources, storage resources, and network resources) owned by a cloud service provider. The computing resources included in the cloud data center may be a large quantity of computing devices (for example, servers). The apparatus 900 may be a server that is in the cloud data center and that is configured to control the traveling of the vehicle by using the policy control system. Alternatively, the apparatus 900 may be a virtual machine that is created in the cloud data center and that is configured to control the traveling of the vehicle by using the policy control system. The apparatus 900 may alternatively be a software apparatus deployed on the server or the virtual machine in the cloud data center. The software apparatus is configured to control the traveling of the vehicle by using the policy control system. The software apparatus may be deployed on a plurality of servers in a distributed manner, deployed on a plurality of virtual machines in a distributed manner, or deployed on the virtual machine and the server in a distributed manner. For example, the behavior output module 910, the trajectory output module 920, and the control module 930 in the apparatus 900 may be deployed on the plurality of servers in the distributed manner, deployed on the plurality of virtual machines in the distributed manner, or deployed on the virtual machine and the server in the distributed manner. For another example, when the control module 930 includes a plurality of submodules, the plurality of submodules may be deployed on the plurality of servers, deployed on the plurality of virtual machines in the distributed manner, or deployed on the virtual machine and the server in the distributed manner.

The apparatus 900 may be abstracted by the cloud service provider on the cloud service platform into a cloud service for controlling the traveling of the vehicle by using the policy control system and provided for the user. After the user purchases the cloud service on the cloud service platform, the cloud environment provides, for the user by using the cloud service, the cloud service for controlling the traveling of the vehicle by using the policy control system. The user may upload environment information, status information, and action information of the vehicle to the cloud environment through an application programming interface or by using a web page provided by the cloud service platform. After obtaining a control policy (for example, trajectory information) by using the policy control system, the apparatus 900 returns the control policy to the vehicle, to control the traveling of the vehicle.

When the apparatus 900 is the software apparatus, the apparatus 900 may alternatively be independently deployed on a computing device in any environment.

Figure 10:
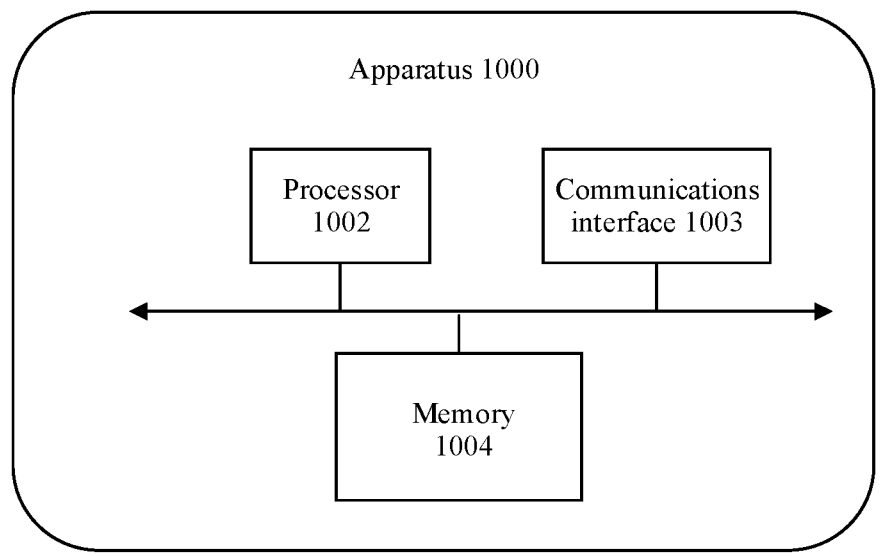
FIG. 10 is a schematic diagram of a structure of an apparatus according to an embodiment of this application.

FIG. 10 is a schematic diagram of a structure of an apparatus 1000 according to an embodiment of this application. The apparatus 1000 includes a processor 1002, a communications interface 1003, and a memory 1004. An example of the apparatus 1000 is a chip. Another example of the apparatus 1000 is a computing device.

The processor 1002, the memory 1004, and the communications interface 1003 may communicate with each other through a bus. The memory 1004 stores executable code. The processor 1002 reads the executable code in the memory 1004 to perform a corresponding method. The memory 1004 may further include another software module, for example, an operating system, for running a process. The operating system may be Linux™, Unix™, Windows™, or the like.

For example, the executable code in the memory 1004 is used to implement the method shown in any one of FIG. 4 to FIG. 7. The processor 1002 reads the executable code in the memory 1004 to perform the method shown in any one of FIG. 4 to FIG. 7.

The processor 1002 may be a CPU. The memory 1004 may include a volatile memory (volatile memory), for example, a random access memory (RAM). The memory 1004 may further include a non-volatile memory (NVM), for example, a read-only memory (ROM), a flash memory, a hard disk drive (HDD), or a solid-state initiator (SSD).

Figure 11:
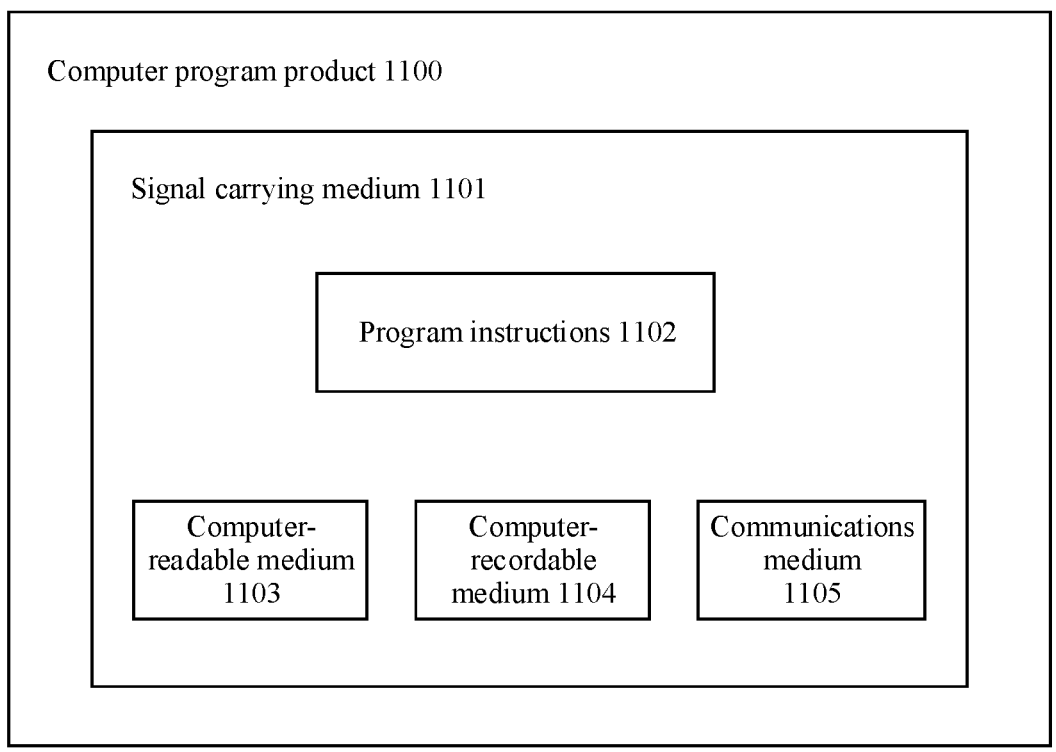
FIG. 11 is a schematic diagram of a structure of a computer program product according to an embodiment of this application.

In some embodiments of this application, the disclosed method may be implemented as computer program instructions encoded in a machine-readable format on a computer-readable storage medium or encoded on another non-transitory medium or product. FIG. 11 schematically shows a conceptual partial view of an example computer program product arranged according to at least some embodiments shown herein. The example computer program product includes a computer program for executing a computer process on a computing device. In an embodiment, the example computer program product 1100 is provided by using a signal carrying medium 1101. The signal carrying medium 1101 may include one or more program instructions 1102. When the program instructions 1102 are run by one or more processors, the functions or some of the functions described in the method shown in any one of FIG. 4 to FIG. 7 may be provided. Therefore, for example, refer to the embodiment shown in FIG. 4. One or more features of S410 to S430 may be borne by one or more instructions associated with the signal carrying medium 1101. For another example, refer to the embodiment shown in FIG. 5. One or more features of S510 to S550 may be borne by one or more instructions associated with the signal carrying medium 1101.

In some embodiments, the signal carrying medium 1101 may include a computer-readable medium 1103, for example but not limited to, a hard disk drive, a compact disc (CD), a digital video disc (DVD), a digital tape, a memory, a read-only memory (ROM), a random access memory (RAM), or the like. In some implementations, the signal carrying medium 1101 may include a computer-recordable medium 1104, for example but not limited to, a memory, a read/write (R/W) CD, an R/W DVD, or the like. In some implementations, the signal carrying medium 1101 may include a communications medium 1105, for example but not limited to a digital and/or analog communications medium (for example, an optical fiber cable, a waveguide, a wired communications link, a wireless communications link, or the like). Therefore, for example, the signal carrying medium 1101 may be conveyed by the communications medium 1105 in a wireless form (for example, a wireless communications medium that complies with the IEEE 802.11 standard or another transmission protocol). The one or more program instructions 1102 may be, for example, one or more computer-executable instructions or one or more logic implementation instructions. In some examples, the foregoing computing device may be configured to provide various operations, functions, or actions in response to the program instructions 1102 that are transmitted to the computing device by using one or more of the computer-readable medium 1103, the computer-recordable medium 1104, and/or the communications medium 1105. It should be understood that the arrangement described herein is merely used as an example. Therefore, a person skilled in the art understands that other arrangements or other elements (for example, a machine, an interface, a function, a sequence, and a function group) can be used instead, and that some elements may be omitted based on an expected result. In addition, a plurality of the described elements are functional entities that can be implemented as discrete or distributed components, or implemented in any suitable combination at any suitable location in combination with another component.

A person of ordinary skill in the art may be aware that, in combination with the examples described in embodiments disclosed in this specification, units and algorithm operations may be implemented by electronic hardware or a combination of computer software and electronic hardware. Whether functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory, a random access memory, a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for optimizing decision-making regulation and control, comprising:
   obtaining a first trajectory sequence that comprises trajectory information of a vehicle in a first environment;
   obtaining first target driving behavior information output by a behavior decision-making layer of a decision-making and control system based on information about the first environment;
   combining the first trajectory sequence and the first target driving behavior information to obtain a first traveling sequence;

obtaining a second trajectory sequence output by a motion planning layer of the decision-making and control system based on preset second target driving behavior information;

combining the second trajectory sequence and the second target driving behavior information to obtain a second traveling sequence;

optimizing the behavior decision-making layer based on a difference between the first traveling sequence and a preset target teaching traveling sequence, wherein the target teaching traveling sequence comprises a teaching trajectory sequence and teaching driving behavior information; and optimizing the motion planning layer based on a difference between the second traveling sequence and the target teaching traveling sequence.

2. The method according to claim 1, wherein the optimizing the behavior decision-making layer comprises:

obtaining a first output obtained when the first traveling sequence is input into a determining model that is used to determine whether the input traveling sequence is the teaching traveling sequence, and optimizing the behavior decision-making layer based on the first output;

wherein the optimizing the motion planning layer comprises:

obtaining a second output obtained when the second traveling sequence is input into the determining model, and optimizing the motion planning layer based on the second output; and wherein the method further comprises:

obtaining a third output obtained when the target teaching traveling sequence is input into the determining model, and optimizing the determining model based on the first output, the second output, and the third output.

3. The method according to claim 2, wherein the optimizing the motion planning layer based on the second output comprises:

optimizing the motion planning layer based on the second output by using a policy optimization algorithm.

4. The method according to claim 2, wherein the optimizing the behavior decision-making layer based on the first output comprises:

obtaining a gradient of a first function, and optimizing the behavior decision-making layer based on the gradient of the first function using a gradient descent algorithm, wherein an independent variable of the first function comprises the first output.

5. The method according to claim 4, wherein the first function is defined as follows:

$$\frac{1}{N}\sum_{j=1}^{N}\left[\frac{1-\omega}{T_j}\sum_{t=1}^{T_j}\log D_\psi(s_t^c, a_t^c, c_j^c) - \frac{\lambda_E}{T_j}\sum_{t=1}^{T_j}c_j^e\log p_{c_a}(c_t^c \mid s_t^e, a_{t-1}^e) - \frac{\lambda_G}{T_j}\sum_{t=1}^{T_j}c_j^e\log p_{c_a}(c_t^c \mid s_t^g, a_{t-1}^g)\right],$$

wherein

N represents a preset quantity of times of optimizing the behavior decision-making layer based on the gradient of the first function, $\omega$ is a preset value, $T_j$ represents a length of the first trajectory sequence, $D_\psi(s_t^c, a_t^c c_j^c)$ represents the first output, $\lambda_E$ is a preset value, $c_j^e$ represents corresponding teaching traveling behavior during a $j^{th}$ time of the N times of optimization, $p_{c_a}(c_t^c \mid s_t^e, a_{t-1}^e)$ represents a conditional probability of outputting traveling behavior $c_t^c$ by the behavior decision-making layer when an input of the behavior decision-making layer is the teaching trajectory sequence, and $\lambda_G$ is a preset value.

6. The method according to claim 2, wherein the optimizing the determining model based on the first output, the second output, and the third output comprises:

obtaining a gradient of a second function, and optimizing the determining model based on the gradient of the second function using a gradient ascent algorithm, wherein independent variables of the second function comprise the first output, the second output, and the third output.

7. The method according to claim 1, wherein the target teaching traveling sequence is selected from a preconfigured teaching data set, and the teaching data set comprises a plurality of teaching traveling sequences in a first driving scenario; and the method further comprises:

updating the teaching data set, wherein the updated teaching data set comprises a teaching traveling sequence in a second driving scenario.

8. The method according to claim 1, wherein the target teaching traveling sequence is a traveling sequence collected when a driver drives the vehicle.

9. A method for controlling traveling of a vehicle by using a decision-making and control system, wherein the decision-making and control system comprises a behavior decision-making layer and a motion planning layer, the decision-making and control system is obtained through optimization by using the method according to claim 1, and the method comprises:

outputting target driving behavior information of the vehicle based on environment information of the vehicle by using the behavior decision-making layer;

outputting trajectory information of the vehicle based on the target driving behavior information by using the motion planning layer; and controlling traveling of the vehicle based on the trajectory information.

10. An apparatus for optimizing decision-making regulation and control, the apparatus comprising:

an obtaining module, configured to
obtain a first trajectory sequence that comprises trajectory information of a vehicle in a first environment,
obtain first target driving behavior information output by a behavior decision-making layer of a decision-making and control system based on information about the first environment, and
obtain a second trajectory sequence output by a motion planning layer of the decision-making and control system based on preset second target driving behavior information;

a combination module, configured to
combine the first trajectory sequence and the first target driving behavior information to obtain a first traveling sequence, and
combine the second trajectory sequence and the second target driving behavior information to obtain a second traveling sequence; and an optimization module, configured to
optimize the behavior decision-making layer based on a difference between the first traveling sequence and a preset target teaching traveling sequence, wherein the target teaching traveling sequence comprises a teaching trajectory sequence and teaching driving behavior information, and optimize the motion planning layer based on a difference between the second traveling sequence and the target teaching sequence.

11. The apparatus according to claim 10, wherein the optimization module is further configured to:

obtain a first output obtained when the first traveling sequence is input into a determining model that is used to determine whether the input traveling sequence is the teaching traveling sequence;

optimize the behavior decision-making layer based on the first output;

obtain a second output obtained when the second traveling sequence is input into the determining model;

optimize the motion planning layer based on the second output;

obtain a third output obtained when the target teaching traveling sequence is input into the determining model; and optimize the determining model based on the first output, the second output, and the third output.

12. The apparatus according to claim 11, wherein the optimization module is further configured to:

optimize the motion planning layer based on the second output by using a policy optimization algorithm.

13. The apparatus according to claim 11, wherein the optimization module is further configured to:

obtain a gradient of a first function, and optimize the behavior decision-making layer based on the gradient of the first function using a gradient descent algorithm, wherein an independent variable of the first function comprises the first output.

14. The apparatus according to claim 11, wherein the first function is defined as follows:

$$\frac{1}{N}\sum_{j=1}^{N}\left[\frac{1-\omega}{T_j}\sum_{t=1}^{T_j}\log D_\psi(s_t^c, a_t^c, c_j^c) - \frac{\lambda_E}{T_j}\sum_{t=1}^{T_j}c_j^e\log pc_a(c_t^c \mid s_t^e, a_{t-1}^e) - \frac{\lambda_G}{T_j}\sum_{t=1}^{T_j}c_j^e\log pc_a(c_t^c \mid s_t^g, a_{t-1}^g)\right].$$

wherein

N represents a preset quantity of times of optimizing the behavior decision-making layer based on the gradient of the first function, ω is a preset value, $T_j$ represents a length of the first trajectory sequence, $D_\psi(s_t^c, a_t^c, c_j^c)$ represents the first output, $\lambda_E$ is a preset value, $c_j^e$ represents corresponding teaching traveling behavior during a $j^{th}$ time of the N times of optimization, $p_{c_a}(c_t^e \mid s_t^e, a_{t-1}^e)$ represents a conditional probability of outputting traveling behavior $c_t^c$ by the behavior decision-making layer when an input of the behavior decision-making layer is the teaching trajectory sequence, and $\lambda_G$ is a preset value.

15. The apparatus according to claim 11, wherein the optimization module is further configured to:

obtain a gradient of a second function, and optimize the determining model based on the gradient of the second function using a gradient ascent algorithm, wherein independent variables of the second function comprise the first output, the second output, and the third output.

16. The apparatus according to claim 10, wherein the target teaching traveling sequence is selected from a preconfigured teaching data set, and the teaching data set comprises a plurality of teaching traveling sequences in a first driving scenario; and the apparatus further comprises an updating module, configured to update the teaching data set, wherein the updated teaching data set comprises a teaching traveling sequence in a second driving scenario.

17. The apparatus according to claim 10, wherein the target teaching traveling sequence is a traveling sequence collected when a driver drives the vehicle.

18. An apparatus for optimizing decision-making regulation and control, comprising a processor, wherein the processor is coupled to a memory;

the memory is configured to store instructions; and the processor is configured to execute the instructions stored in the memory, to enable the apparatus to implement the method according to claim 1.

19. An apparatus for controlling a vehicle by using a policy control system, comprising a processor, wherein the processor is coupled to a memory;

the memory is configured to store instructions; and the processor is configured to execute the instructions stored in the memory, to enable the apparatus to implement the method according to claim 9.

20. A non-transitory_computer-readable medium, comprising instructions, which when executed by a processor, cause the processor to perform operations, the operations comprising:

obtaining a first trajectory sequence that comprises trajectory information of a vehicle in a first environment;

obtaining first target driving behavior information output by a behavior decision-making layer of a decision-making and control system based on information about the first environment;

combining the first trajectory sequence and the first target driving behavior information to obtain a first traveling sequence;

obtaining a second trajectory sequence output by a motion planning layer of the decision- making and control system based on preset second target driving behavior information;

combining the second trajectory sequence and the second target driving behavior information to obtain a second traveling sequence;

optimizing the behavior decision-making layer based on a difference between the first traveling sequence and a preset target teaching traveling sequence, wherein the target teaching traveling sequence comprises a teaching trajectory sequence and teaching driving behavior information; and optimizing the motion planning layer based on a difference between the second traveling sequence and the target teaching traveling sequence.

* * * * *